(12) United States Patent
Ito

(10) Patent No.: US 6,983,254 B2
(45) Date of Patent: Jan. 3, 2006

(54) METHOD AND APPARATUS FOR ACCEPTING AND PROCESSING AN APPLICATION FOR CONFORMITY OF A USER DICTIONARY TO A STANDARD DICTIONARY

(75) Inventor: Satoshi Ito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 592 days.

(21) Appl. No.: 09/910,848

(22) Filed: Jul. 24, 2001

(65) Prior Publication Data

US 2002/0013741 A1 Jan. 31, 2002

(30) Foreign Application Priority Data

Jul. 25, 2000 (JP) ........................ 2000-224257

(51) Int. Cl.
*G06F 17/60* (2006.01)

(52) U.S. Cl. ............................. 705/26; 705/27; 705/28; 709/206; 709/218; 709/219

(58) Field of Classification Search .................. 705/22, 705/26–29; 709/206, 218–219; G06F 17/60
See application file for complete search history.

(56) References Cited

U.S. PATENT DOCUMENTS

| | | | | | |
|---|---|---|---|---|---|
| 5,142,662 | A | * | 8/1992 | Gump et al. ............. | 715/501.1 |
| 5,168,444 | A | * | 12/1992 | Cukor et al. .................. | 705/1 |
| 5,175,797 | A | * | 12/1992 | Funabashi et al. ............ | 706/16 |
| 5,204,821 | A | * | 4/1993 | Inui et al. .................... | 700/106 |
| 5,438,508 | A | * | 8/1995 | Wyman ........................ | 705/8 |
| 5,694,546 | A | * | 12/1997 | Reisman ...................... | 705/26 |
| 5,694,551 | A | * | 12/1997 | Doyle et al. .................. | 705/26 |
| 5,708,960 | A | * | 1/1998 | Kamisaka et al. ............ | 725/31 |
| 5,897,639 | A | * | 4/1999 | Greef et al. ............ | 707/103 R |

(Continued)

FOREIGN PATENT DOCUMENTS

| | | | | |
|---|---|---|---|---|
| EP | 1040440 A1 | * | 10/2000 | |
| EP | 1040441 A2 | * | 10/2000 | |
| JP | 407160713 A | * | 6/1995 | |
| JP | 2000-222457 | | 8/2000 | |
| JP | 2001-147921 | | 5/2001 | |
| JP | 001176534 A1 | * | 1/2002 | |
| JP | 02002259432 A | * | 9/2002 | |
| JP | 2003337690 A | * | 11/2003 | |
| WO | WO 200104852 A1 | * | 1/2001 | |
| WO | WO 3007211 A1 | * | 1/2003 | |
| WO | WO 2003016546 A1 | * | 2/2003 | |

OTHER PUBLICATIONS

Trommer, D., ECS catalog merces EDI/Net Platforms: enables online ordering in EDI format over net, EBN, May 20, 1996, p. 54.*

Trommer, D., GE/Netscape form software venture: will focus on electronic commerce solutions, EBN, Apr. 22, 1996, p. 54.*

(Continued)

*Primary Examiner*—Cuong Nguyen
(74) *Attorney, Agent, or Firm*—Oblon, Spivak, McClelland, Maier & Neustadt, P.C.

(57) ABSTRACT

There is disclosed an electronic catalog system in which application data concerning use is received from a user who desires to utilize electronic catalog information using a standard dictionary, internal utilization or opening to the outside of the standard supplier by the user is judged, and for the internal utilization, the standard dictionary and a program for verifying a conformity level are distributed free of charge. If the user desires the opening to the outside including an information providing service, a charged amount is transmitted to the user from charging level data based on the application data, a supplier code is issued after agreement with the user, and the standard dictionary is transmitted together with the program for verifying the desired conformity level.

17 Claims, 32 Drawing Sheets

U.S. PATENT DOCUMENTS

| | | | | | |
|---|---|---|---|---|---|
| 5,970,472 | A | * | 10/1999 | Allsop et al. | 705/26 |
| 6,026,379 | A | * | 2/2000 | Haller et al. | 705/34 |
| 6,134,304 | A | * | 10/2000 | Norell | 379/100.05 |
| 6,334,115 | B1 | * | 12/2001 | Kuribayashi et al. | 705/27 |
| 6,356,937 | B1 | * | 3/2002 | Montville et al. | 709/206 |
| 6,363,363 | B1 | * | 3/2002 | Haller et al. | 705/40 |
| 6,400,996 | B1 | * | 6/2002 | Hoffberg et al. | 700/83 |
| 6,448,979 | B1 | * | 9/2002 | Schena et al. | 715/741 |
| 6,480,846 | B2 | * | 11/2002 | Kuribayashi et al. | 707/6 |
| 6,571,282 | B1 | * | 5/2003 | Bowman-Amuah | 709/219 |
| 6,594,692 | B1 | * | 7/2003 | Reisman | 709/219 |
| 6,606,744 | B1 | * | 8/2003 | Mikurak | 717/174 |
| 6,611,862 | B2 | * | 8/2003 | Reisman | 709/217 |
| 6,647,383 | B1 | * | 11/2003 | August et al. | 707/3 |
| 6,714,920 | B1 | * | 3/2004 | Arai | 705/52 |
| 6,763,334 | B1 | * | 7/2004 | Matsumoto et al. | 705/1 |
| 6,842,881 | B2 | * | 1/2005 | Croke et al. | 716/1 |
| 6,901,380 | B1 | * | 5/2005 | Bremers | 705/27 |
| 6,928,412 | B2 | * | 8/2005 | DeBiasse | 705/7 |
| 2001/0014868 | A1 | * | 8/2001 | Herz et al. | 705/14 |
| 2002/0013741 | A1 | * | 1/2002 | Ito | 705/26 |
| 2003/0221171 | A1 | * | 11/2003 | Rust et al. | 715/532 |
| 2003/0229595 | A1 | * | 12/2003 | Mononen et al. | 705/63 |
| 2004/0102958 | A1 | * | 5/2004 | Anderson | 704/4 |
| 2004/0196307 | A1 | * | 10/2004 | Zak et al. | 345/733 |
| 2004/0205671 | A1 | * | 10/2004 | Sukehiro et al. | 715/532 |

OTHER PUBLICATIONS

Marvin Sirbu et al., NetBill: an internet commerce system optimized for network delivered services, IEEE Comp. Conference, Mar. 1995.*

Electronic Engineers Master Catalog and Purchasing Guide of the Electronic Industry, EEM, 1964–1965, Hewlett–Packard, date unknown, presumbably 1964.*

Carolyn Karr, Advanced Imaging, vol. 10, No. 11, p. 77, Industrial multimedia at Mazda Australia: imaging & graphics for parts ordering, Nov. 1995.*

CD Computing News, vol. 5, No. 4, Reference Technology introduces parts book application package, Apr. 1991.*

Joachim Kroll, Finding, not searching multimedia database for electronic components: the CD catalogue celebrates its debut, vol. 43, No. 20, Oct. 4, 1994, pp. 92–94, 98.*

Unknown, DBA Manufacturing next–generation: User Guide Collection by DBA Software, 2004 DBA Software, Inc.*

Ellen Neuborne, Catalogers: Adapting to soaring costs, USA Today, Feb. 19, 1991, p. B2.*

John Waggoner, AmEx fees upset catalog retailers, USA Today, May 29, 1991, p. B2.*

Susan Tompor, Postal rate hike may downsize catalogues, Detroit News, Jan. 9, 1991, p. H2.*

Esther Dyson, All sides can win with electronic catalogs, ComputerWorld, Apr. 24, 1995, vol. 29, issue 17, p. 37.*

ISO/IS 13584–42; ISO TC184/SC4/WG2 N 376; Jun. 5, 1997, Abstract Only.

* cited by examiner

|  | Liecense 0 | Liecense 1 | Liecense 2 | Liecense 3 | Liecense 4 |
|---|---|---|---|---|---|
| Level 1C | Charging level 01 | — | Charging level 08 | Charging level 09 | Charging level 010 |
| Level 1E | — | — | Charging level 07 | Charging level 08 | Charging level 09 |
| Level 2C | Charging level 01 | Charging level 02 | Charging level 06 | Charging level 07 | Charging level 08 |
| Level 2E | — | Charging level 02 | Charging level 06 | Charging level 07 | Charging level 08 |
| Level 3C | Charging level 01 | — | Charging level 05 | Charging level 06 | Charging level 07 |
| Level 3E | — | — | — | — | — |
| Level 4C | Charging level 01 | Charging level 02 | Charging level 05 | Charging level 06 | Charging level 07 |
| Level 4E | — | — | Charging level 04 | Charging level 05 | Charging level 06 |
| Level 5C | Charging level 01 | — | — | — | — |
| Level 5E | Charging level 01 | — | — | — | — |
| Level 6C | Charging level 01 | — | — | — | — |
| Level 6E | — | Charging level 02 | Charging level 03 | Charging level 04 | Charging level 05 |

F I G. 4

● Term level : equal in individual term levels, but non-conforming to classification hierarchy and definition attribute

| Level 1C | All terms in user dictionary are equal in definition to terms of standard dictionary |
|---|---|
| Level 1E | Terms in user dictionary and also included in standard dictionary have equal definitions |

● Single-unit object level : equal in individual objects (product-attribute structure), but non-conforming to classification hierarchy

| Level 2C | All objects in user dictionary are equal in definition to objects of standard dictionary |
|---|---|
| Level 2E | Objects in user dictionary and also included in standard dictionary have equal definitions |

● Partial hierarchical leve l : same in partial hierarchical structure of dictionary, but non-conforming to definition attribute

| Level 3C | All hierarchical structures in user dictionary are the same as some of hierarchical structures of standard dictionary |
|---|---|
| Level 3E | Some of hierarchical structures in user dictionary are the same as some of hierarchical structures of standard dictionary |

● Partial hierarchical object level : partial hierarchical structure of user dictionary agrees with standard dictionary, and definition attribute is also equal

| Level 4C | All hierarchical structures (including definition attributes) in user dictionary are the same as some of hierarchical structures of standard dictionary |
|---|---|
| Level 4E | Some of hierarchical structures (including definition attributes) in user dictionary are the same as some of hierarchical structures of standard dictionary |

● Whole hierarchical level : all hierarchical structures of user dictionary agree with standard dictionary, and non-conforming to definition attribute

| Level 5C | All hierarchical structures in user dictionary are the same as all hierarchical structures of standard dictionary |
|---|---|
| Level 5E | Some of hierarchical structures in user dictionary are the same as all hierarchical structures of standard dictionary |

● Whole conformity level : all hierarchical structures of user dictionary agree with standard dictionary, and definition attribute is also equal

| Level 6C | All hierarchical structures (including definition attributes) in user dictionary are the same as all hierarchical structures of standard dictionary |
|---|---|
| Level 6E | Some of hierarchical structures (including definition attributes) in user dictionary are the same as all hierarchical structures of standard dictionary |

FIG. 5

| No | License type | Content |
|---|---|---|
| License 0 | Not extended | Existing dictionary is used as it is |
| License 1 | Definition attribute value added | License in which new value can be added to existing definition attribute (*new class, new definition attribute cannot be added) |
| License 2 | Definition attribute added | License in which new definition attribute can be added to existing object (*new class cannot be added, new value cannot be added to existing definition attribute) |
| License 3 | Reclassification of terminal hierarchy | License in which object of lowermost class is further classified (*including addition of definition attribute and attribute value to new class) |
| License 4 | Add low class to middle class | License in which lower class below arbitrary class other than lowermost class is prepared |

F I G. 6

| No | Applicant name | Supplier code | Dictionary extension license | Dictionary extension license | Conforming start class name | Applicant information/obtained date and address/contact address |
|---|---|---|---|---|---|---|
| 1 | Taro Toshiba | ABCD0001 | Level 5 | License 4 | Motor | ......... |
| 2 | Hanako Toshiba | ABCD0002 | Level 1 | License 0 | — | ......... |
| 3 | ... | ... | ... | ... | ... | ... |
| 4 | | | | | | |

F I G. 7

| Term (product class) detection rule | | |
|---|---|---|
| (RULE1) | IF | ((A=Class_instance) and (A.Code=B.Code) and (A.Preferred name=B.Preferred name)) |
| | THEN | A=B |

| Term (product class) detection rule | | |
|---|---|---|
| (RULE2) | IF | ((A.is_case_of=B.Code) |
| | THEN | A=B |

| Term (product class) evaluation rule | | |
|---|---|---|
| (RULE3) | IF | ((A.Short name=B.Short name) and (A.Definition=B.Definition) and (A.Source document of class definition= B.Source document of class definition)) |
| | THEN | A=B |

| Term (definition attribute) detection rule | | |
|---|---|---|
| (RULE4) | IF | ((A=Property_instance) and (A.Code=B.Code) and (A.Preferred name=B.Preferred name)) |
| | THEN | A=B |

| Term (definition attribute) evaluation rule | | |
|---|---|---|
| (RULE5) | IF | ((A.Short name=B.Short name) and (A.Definition=B.Definition) and (A.Source document of class definition= B.Source document of class definition)) and (A.Synonymous Name=B.Synonymous Name) and (A.preferred letter symbol=B.preferred letter symbol) and (A.Synonymous letter symbol=B.Synonymous letter symbol) and (A.Formula=B.Formula) and (A.Value format=B.Value format) and (A.Unit=B.Unit)) |
| | THEN | A=B |

| Single-unit object evaluation rule | | |
|---|---|---|
| (RULE6) | IF | ((RULE3(A)) and (A.Visible_propety=B.Visible_propety)) |
| | THEN | A=B |

| Classification hierarchy test rule | | |
|---|---|---|
| (RULE7) | IF | ((RULE3(A)) and (A.Superclass=B.Superclass)) |
| | THEN | A=B |

| Classification hierarchy object test rule | | |
|---|---|---|
| (RULE8) | IF | ((RULE6(A)) and (A.Superclass=B.Superclass)) |
| | THEN | A=B |

FIG. 32

METHOD AND APPARATUS FOR ACCEPTING AND PROCESSING AN APPLICATION FOR CONFORMITY OF A USER DICTIONARY TO A STANDARD DICTIONARY

CROSS-REFERENCE TO RELATED APPLICATIONS

This application is based upon and claims the benefit of priority from the prior Japanese Patent Application No. 2000-224257, filed Jul. 25, 2000, the entire contents of which are incorporated herein by reference.

BACKGROUND OF THE INVENTION

1. Field of the Invention

The present invention relates to an electronic catalog system for using a computer network to provide component information, a management operation apparatus of the system, and a management operating method.

2. Description of the Related Art

As a system for using a computer network to provide component information, there is an electronic catalog system. Moreover, "ISO13584 (Parts Library)" is established as international standards for constructing the electronic catalog system to electronically provide component information on Internet. In the "ISO13584", an electronic catalog is comprised of a dictionary and product data, a data structure is given by unifying the dictionary and product data, and thereby sharing/reusing of the component information is intended.

For a component classification in the dictionary defined by the "ISO13584", "component class" is hierarchically represented by a single tree structure. Here, the "component class" indicates a kind of product such as a random access memory (RAM) and processor, and each "component class" has its "property".

The "property" means a technical characteristics possessed by a component. For example, "an operation frequency" and "memory capacity" can be defined as property to describe "RAM class"

The "property" of a certain "component class" is inherited by a sub "component class". Moreover, a unique ID called "BSU code" is attached to the "component class" and "property" so that the class and attribute can univocally be specified. Furthermore, each "component class" has a "supplier code" which describes an ID of supplier who defines the component class itself.

The "ISO13584" provides a framework as the electronic catalog. On the other hand, international standardization of an actual dictionary has also proceeded. For example, in "IEC61360" in the international standards, an upper hierarchical part of the dictionary in an electric/electronic technical field, that is, a standard dictionary of a general part concerning the "component class" and "property" is defined. Thereby, a person who prepares a component catalog of each company extends individual detailed "component class" and "property" on the basis of the "IEC61360", and can prepare respective product data.

Moreover, for the product data prepared as described above, a user of the electronic catalog can trace a classification hierarchy of the "component class", refer to a property value, focus on necessary components, and search for the desired component.

In recent years, in such a trend, some systems have been developed in conformity with the "ISO13584".

However, in the "IEC61360" as the international standards concerning the dictionary, a regulation concerning a principle for preparing the dictionary exists, but there is no regulation for measuring a degree of conformity of the dictionary extended by the user with respect to the existing standard dictionary. Moreover, there is no guideline concerning extension of the existing standard dictionary. Therefore, the extension of the dictionary by each catalog preparing person based on individual interpretation cannot be regulated. Even on the basis of the same standard dictionary, there is a high possibility that dictionaries become remarkably different from one another depending upon the degree of conformity. For example, the dictionary in which only terms used in the standard dictionary are applied and an independent classification hierarchy is constructed is entirely different from the dictionary in which the classification hierarchy of the standard dictionary is also applied. Therefore, when the dictionaries different in conformity degree from one another are opened to the public from various catalog information providers, a remarkable dispersion is generated in a quality of extended dictionary. There is also a problem that it is very difficult to secure compatibility between dictionaries.

When the individually extended dictionary is distributed, and further extended by the other party, originality of the dictionary becomes ambiguous. There is a fear of situation in which the originality cannot be protected by copyright. A second problem remains that it is difficult to secure a compensation for labor/expense borne by the person having prepared the standard dictionary.

Therefore, there is an urgent need for a countermeasure against these problems.

BRIEF SUMMARY OF THE INVENTION

An object of the present invention is to provide a management operation apparatus and management operating method of an electronic catalog system in which compatibility can easily be maintained during preparation of a dictionary.

More specifically, standard dictionaries such as "IEC61360" as an international dictionary standard are presented as a dictionary for use in an electronic catalog system to a supplier. Here, it is supposed that there is an extended dictionary which is to be used by a user (supplier) in preparing user's own electronic catalog and to which a user's own extension is added. There is provided a stepwise degree of conformity of the extended dictionary with respect to the standard dictionary, and a mechanism of evaluating the degree of conformity.

There is also provided a mechanism of granting a stepwise license in accordance with a dictionary extension type, and charging a fee in accordance with a step. As an index for indicating a quality of the extended dictionary is clarified, and a counter value is secured with respect to preparation of an original dictionary.

There is provided a configuration comprising: a charging level generation server function using charging level data in which a degree of conformity with respect to an original standard dictionary and charging information in accordance with a degree of extension to a standard dictionary are stored based on a data structure defined by ISO13584, program for verifying the conformity degree, and supplier information management DB for managing information of a supplier who desires publication of an electronic catalog; and an electronic catalog server function for providing the standard dictionary from the electronic catalog data.

The supplier can disclose and clarify the conformity degree of the extended dictionary used in preparing electronic catalog with respect to the standard dictionary, guarantee the conformity degree, and charge a fee in accordance with the conformity degree and extension level. The charging is set in accordance with the conformity degree, and an environment is created such that the extended dictionary with a high conformity degree spreads.

A level for measuring the degree of conformity of the dictionary extended by the supplier (user's extended dictionary) with respect to the existing standard dictionary is set to manage the extended dictionary, and the quality of the extended dictionary is clearly disclosed. Thereby, reliability of the whole electronic catalog can be enhanced, and mutual compatibility can be enhanced between the supplier dictionary and the standard dictionary, and between the supplier dictionaries.

When the charging method based on the extension degree is provided, the level of conformity with the standard dictionary can entirely be enhanced, and a counter value to a labor/expense for preparing the original dictionary can be secured.

BRIEF DESCRIPTION OF THE SEVERAL VIEWS OF THE DRAWING

FIG. 4 is an explanatory view of the data structure of charging level data 5 in the configuration of FIG. 1;

FIG. 5 is an explanatory view of a conformity level in FIG. 4;

FIG. 6 is an explanatory view of a license type in FIG. 4;

FIG. 7 is an explanatory view of a data structure of supplier information managed by a supplier information management DB 7 in the configuration of FIG. 1;

FIG. 32 is an explanatory view of verification rule data for use in the processing of FIGS. 20 to 31.

DETAILED DESCRIPTION OF THE INVENTION

An embodiment of the present invention will be described hereinafter with reference to the drawings.

<Basic Configuration>

Figure 1:
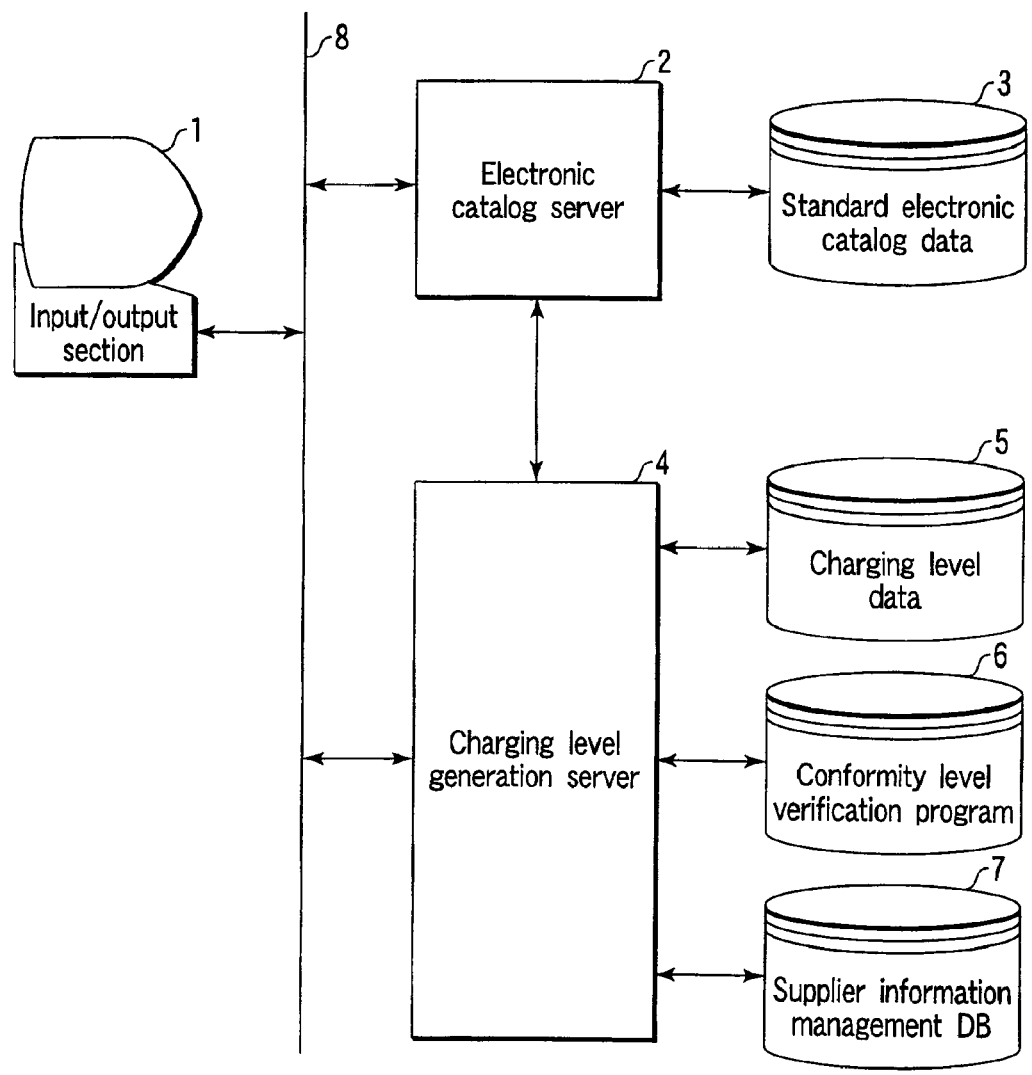
FIG. 1 is a functional block diagram of an electronic catalog utilization system according to one embodiment of the present invention.

FIG. 1 is a block diagram showing a schematic configuration of an electronic catalog utilization system according to one embodiment of the present invention. In FIG. 1, reference numeral 1 denotes an input/output section, 2 denotes an electronic catalog server, 3 denotes standard electronic catalog data, 4 denotes a charging level generation server, 5 denotes charging level data, 6 denotes a conformity level verification program, 7 denotes a supplier information management database (DB), and 8 denotes a network.

The input/output section 1 is a terminal apparatus for use by a supplier, and an intelligent terminal such as a personal computer and workstation, which comprises at least a keyboard, display, memory, processor, large-capacity storage apparatus, interface for communication, and the like. The section inputs/outputs and displays information and instruction, executes a required calculation processing, control and program, and performs communication, and the like. The input/output section 1 is connected to the network 8.

The electronic catalog server 2 holds the standard electronic catalog data 3, and is connected to the network 8.

The charging level generation server 4 has the charging level data 5, conformity level verification program 6, and supplier information management DB 7.

The server is connected to the input/output section 1 of the supplier via the network 8, and uses the charging level data 5 in accordance with the information given from the supplier via the input/output section 1 to present a charged amount.

The server has a function of transmitting the corresponding program out of the conformity level verification program 6, transmitting standard dictionary data from the standard electronic catalog data 3 via the electronic catalog server 2, and registering supplier information into the supplier information management DB 7.

The system of the present embodiment uses the standard dictionary of an electronic catalog system in international standards to form a component as a sales object article to be handled by the system into electronic catalog information (catalog product data), and can rationally execute a conformity degree management of catalog product data preparation for a supplier desiring to open the product data to the public so that a general user utilizes the product data.

Also, the system of the present embodiment leads the supplier who desires to open the catalog product data to file an application for use of the standard dictionary of the electronic catalog system in the international standards to a window system of a management operation organization of the international standards.

Concretely, the supplier is led to use the input/output section 1, transmit application data for the use of dictionary to the charging level generation server 4 which also serves as a window system of the management operation organization via the network 8, and access to the charging level generation server 4 for the application.

Examples of a content of the dictionary use application data inputted to the charging level generation server 4 by the supplier include "whether or not utilization is accompanied by opening to the outside", "desired conformity level", "level of extension license to be obtained", "user name", "address", and the like.

To the supplier having transmitted the application data for the use of the dictionary and accessed the charging level generation server 4, the server uses the charging level data 5 to present the charged amount in accordance with the application data content, and selects and transmits a verification program corresponding to the conformity level for the application data content from the conformity level verification program 6, and transmits standard dictionary data from the standard electronic catalog data 3 via the electronic catalog server 2. Additionally, the server registers these supplier information to the supplier information management DB 7.

As a result, the standard dictionary to be in conformity with the electronic catalog system of the international standards is presented to the supplier.

The supplier has an electronic catalog utilization system for using the content of the standard dictionary to prepare the catalog product data so that information of a component handled by the supplier can be searched. Thereby, the electronic catalog utilization system can be utilized by the electronic catalog system.

Information of a degree of conformity of the catalog product data prepared by the supplier with respect to the standard dictionary, and a degree of extension to the standard dictionary are recognized from the application information, and the corresponding fee is charged.

When the verification program for verifying the conformity level of the catalog product data is provided, a quality and mutual operability of an extended dictionary possessed by the catalog product data supplied by the supplier, and additionally a fee can be charged in accordance with an extension level of the dictionary.

The system of the present embodiment predetermines the degree of conformity with a standard of the electronic catalog system with respect to the supplier who is to utilize the standard of the electronic catalog system in the international standards and open the catalog product data indicating the component information handled by the supplier.

A charged amount for utilization is determined without departing from the determined conformity degree, and the fee is collected from the supplier. Additionally, the verification program for verifying the conformity degree of the prepared catalog product data is granted to the supplier so that the supplier can verify the catalog product data. Thereby, the configuration of the catalog product data opened from the supplier is regulated so that extension excessively does not deviate from the standard.

The catalog product data are preferably prepared in the configuration conforming to the standard dictionary of the electronic catalog system of the international standards.

In order to induce the configuration as much as possible, when the configuration conforms to the standard, the charged amount is set to be smaller. When the configuration departs from the standard with a higher degree, the charged amount is set to be larger.

Moreover, in addition to the charging system, the verification program is presented to the supplier in accordance with the degree of conformity granted to the supplier, so that the supplier checks the completed catalog product data with this program. It can be verified whether the conformity level agrees with a permitted content, and the quality of the dictionary is stabilized.

<Processing of Charging Level Generation Server 4>

As described above, a content required by the supplier for preparing the product data is known from the content of the application data of the supplier, the degree of conformity with the standard is known, the charging level is determined, and a license fee is collected. Additionally, the license is granted in accordance with the conformity degree, and the catalog product data whose extension is permitted in a licensed range can be prepared and distributed.

Therefore, in order to obtain the charging information whose charging level is changed in accordance with the conformity degree, the charging level generation server 4 prepares charging level data 5.

Moreover, the verification program for each conformity level is prepared in a database of the conformity level verification program 6 so that the permitted conformity level can be maintained.

The supplier information management DB 7 is prepared in order to manage the information of the supplier having the license granted. Therefore, the application data and charging level are determined, the license is granted, the verification program is presented to the supplier, and the supplier having the license granted can be managed.

The charging level generation server 4 is connected to the input/output section 1 of the supplier via the network 8.

The server uses the charging level data 5 to present the charged amount in accordance with the information content of the application data given from the supplier via the input/output section 1 on a supplier side who is to prepare the catalog product data;

transmits the corresponding program out of the conformity level verification program 6, transmits the standard dictionary data from the standard electronic catalog data 3 via the electronic catalog server 2, and registers the supplier information into the supplier information management DB 7.

Figure 2:
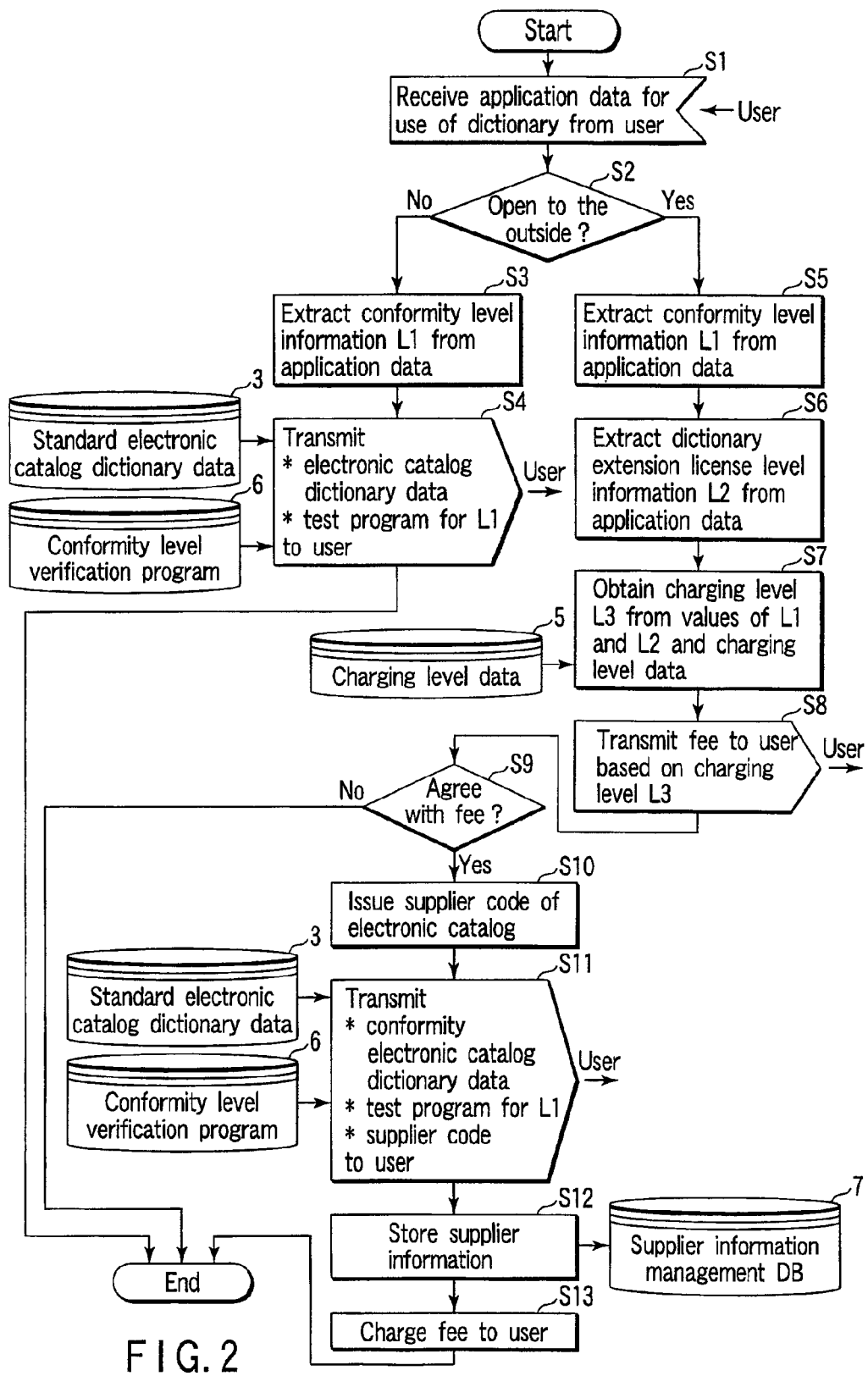
FIG. 2 is a flowchart of a processing procedure of a charging level generation server 4 in a configuration of FIG. 1.

FIG. 2 is a flowchart of a processing procedure of the charging level generation server 4. As shown in FIG. 2, on receiving a request for an access from the supplier, the charging level generation server 4 first receives application data concerning the use (receives the application data for obtaining the license) from the user (supplier) who desires to use the standard dictionary and prepare the electronic catalog information in processing S1.

The application data includes information such as

[i] whether or not utilization is accompanied by opening to the outside,

[ii] desired conformity level,

[iii] level of extension license to be obtained,

[iv] user name,

[v] address", and the like.

On receiving the application data from the supplier (application supplier) having requested for the access, the charging level generation server 4 uses the data to perform a processing of the next S2. That is, in the processing S2 the application data [i] is used to judge whether the standard dictionary desired to be utilized by the application supplier is utilized inside or opened to the outside.

As a result, with the inside utilization, the application data [ii] is used and subjected to processing S3 and S4. Then, the standard dictionary, and the program for verifying the conformity level desired by the application supplier are sent to the application supplier. In this case, since the dictionary is not opened to the outside, a supplier code for identifying the supplier (user) is not issued. Moreover, the quality of the dictionary does not have to be guaranteed to the third party, a fee concerning extension is not charged.

On the other hand, as a result of judgment in the processing S2, when the application supplier (user) desires to open the dictionary to the outside including an information providing service, the charged amount is obtained from the charging level data 5 based on the application data (processing S5 to S7), and transmitted to the application supplier (user) (processing S8).

Subsequently, the server waits for a response from the application supplier (user). Moreover, when there is a response indicating approval from the application supplier, that is, when agreement with the application supplier is established (processing S9), the charging level generation server 4 issues the supplier code inherent to the application supplier (processing S10). The server transmits the standard dictionary, verification program for verifying the conformity level corresponding to the conformity level desired by the application supplier, and the issued supplier code to the input/output section 1 of the application supplier (processing S11).

Moreover, the server stores the application data of the application supplier, and information of the supplier code issued to the application supplier as supplier data in the supplier information management DB 7 so that the data is managed (processing S12). Finally, the amount is charged to the application supplier (user) (processing S13).

21 Data Structure of Standard Electronic Catalog Data 3>

Figure 3:
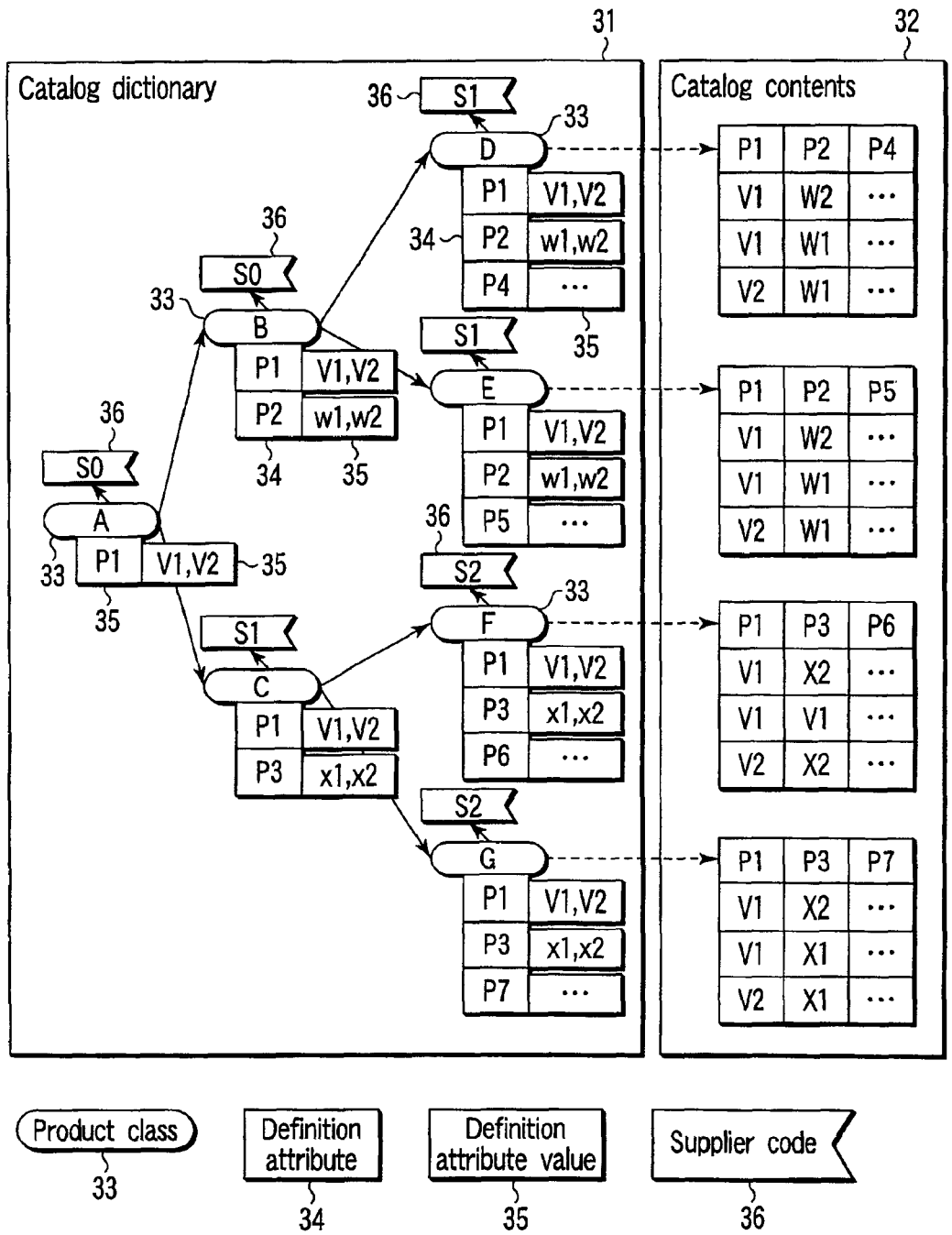
FIG. 3 is an explanatory view of a data structure of standard electronic catalog data 3 in the configuration of FIG. 1.

FIG. 3 is an explanatory view of a data structure of the standard electronic catalog data 3 in FIG. 1. As shown in FIG. 3, the standard electronic catalog data 3 is comprised of a catalog dictionary 31 and catalog contents 32. As the catalog dictionary 31, the standard dictionary or a user dictionary as a dictionary extended by a user is attached.

The catalog dictionary 31 is hierarchically represented in a single tree structure by a component class 33 for component classification. Each component class 33 has a property 34. When a prospective value taken by the property 34 is determined, the attribute may have a property value 35.

Moreover, the component class 33 has a supplier code 36 indicating a location of a responsibility for definition of the class. Therefore, when the user (product data supplier) extends the standard dictionary in the electronic catalog system with the international standards, and prepares the new component class 33, the supplier code 36 obtained by the user during application is the supplier code 36 of the new component class 33.

Since the structure having the supplier code is employed, the responsibility of the user having extended the dictionary is clarified, and a copyright can also be clarified with respect to the extended dictionary.

<Data Structure of Charging Level Data 5>

FIG. 4 is an explanatory view of the data structure of the charging level data 5. In FIG. 4, a vertical axis indicates the level of conformity with the standard dictionary. In the present embodiment, "12" levels in total of "Level 1C", "Level 1E", "Level 2C", "Level 2E", "Level 3C", "Level 3E", "Level 4C", "Level 4E", "Level 5C", "Level 5E", "Level 6C", and "Level 6E" are disposed based on the dictionary structure defined in "ISO13584".

Moreover, for the level, in a downward direction of the table, that is, with a larger number, the degree of conformity with the standard dictionary increases, and the quality of the extended dictionary is high. Additionally, there are two types of conformity levels with a suffix "C" ("C" appearing on an end of a word indicating the level as in "Level 1C", "Level 2C", or "Level 3C") and "E" ("E" appearing on the end of the word indicating the level as in "Level 1E", "Level 2E", or "Level 3E"). In this case, the level having the suffix "C" declares that a new definition is not particularly performed, the level is necessarily a partial assembly of the standard dictionary, and the degree of conformity with the standard dictionary is very high. Therefore, the license is granted to this type of level at a smallest fee in the charging system.

Conversely, in the level having the suffix "E", the extension by the user is permitted, the degree of conformity with the standard dictionary is therefore deteriorated, and a large fee is charged to the granted license.

In the system of the present embodiment, the license is granted while the fee is charged in accordance with the conformity degree. Moreover, the fee is charged to the user in accordance with a combination of two axes of step levels of "1" to "6" and conformity classes "C" and "E". For example, when the conformity with the standard dictionary is high, the fee is set to be small. When the conformity is low, the fee is set to be high. Thereby, mutual operability can be enhanced between the dictionaries in the system. The user utilizes the dictionary with a fee which is as small as possible. As a result, the catalog product data conforming to the standard dictionary naturally increases largely, and it is considered that the mutual operability between the dictionaries can be enhanced.

Moreover, the horizontal axis indicates the license to the standard dictionary by an extension type, and there are five steps of "License0" to "License4" in the present embodiment. In a rightward direction, the license indicates a higher degree of freedom of extension.

<Conformity Level>

FIG. 5 is an explanatory view of the conformity level in FIG. 4. The conformity level will be described hereinafter in detail.

1) Term Level (Level 1)

A conformity level "Level 1" indicates that the user dictionary conforms to the standard dictionary only with respect to a term. That is, individual names for use are equal, but a classification hierarchical structure, and a property possessed by the component class are different. Concretely, "Level 1C" indicates that all terms in the user dictionary have definitions equal to those of the terms of the standard dictionary (see FIG. 8), and "Level 1E" indicates that the term in the user dictionary having a name equal to the name of the term included in the standard dictionary has the equal definition (see FIG. 9).

2) Single-Unit Object Level (Level 2)

A conformity level "Level 2" indicates that the user dictionary conforms to the standard dictionary only with respect to a single-unit object. That is, individual structures (hereinafter referred to the object) comprised by combining individual component classes with properties are equal, but the classification hierarchical structure is different. Concretely, "Level 2C" indicates that all objects in the user dictionary have definitions equal to those of the objects of the standard dictionary (see FIG. 10), and "Level 2E" indicates that the object in the user dictionary and also included in the standard dictionary has the equal definition (see FIG. 11).

3) Partial Hierarchical Level (Level 3)

A conformity level "Level 3" indicates that the user dictionary conforms to the standard dictionary only with respect to a partial hierarchy. That is, a partial hierarchical structure of the component class of the dictionary is the same, but the property is not particularly limited. In this case, the user needs to designate the component class in the standard dictionary to which the conforming is to be started. Concretely, "Level 3C" indicates that all hierarchical structures in the user dictionary are the same as some of the hierarchical structures of the standard dictionary (see FIG. 12), and "Level 3E" indicates that some of the hierarchical structures in the user dictionary are the same as those of the standard dictionary (see FIG. 13).

4) Partial Hierarchical Object Level (Level 4)

A conformity level "Level 4" indicates that the user dictionary conforms to the standard dictionary only with respect to some of hierarchical objects. That is, some the hierarchical structures of the user dictionary agree with the structures of the standard dictionary, and the properties are also equal. In this case, the user needs to designate the component class in the standard dictionary to which the conforming is to be started. Concretely, "Level 4C" indicates that all hierarchical structures (including the properties) in the user dictionary are the same as some of the hierarchical structures of the standard dictionary (see FIG. 14), and "Level 4E" indicates that some of the hierarchical structures (including the properties) in the user dictionary are the same as those of the standard dictionary (see FIG. 15).

5) Whole Hierarchical Level (Level 5)

A conformity level "Level 5" indicates that the user dictionary conforms to the standard dictionary with respect to the whole hierarchy. That is, whole hierarchical structure of the user dictionary is the same as that of the standard dictionary, but the property is not particularly limited. Concretely, "Level 5C" indicates that all hierarchical structures in the user dictionary are the same as all hierarchical structures of the standard dictionary (see FIG. 16), and "Level 5E" indicates that some of the hierarchical structures in the user dictionary are the same as all the hierarchical structures of the standard dictionary (see FIG. 17).

6) Complete Conformity Level (Level 6)

A conformity level "Level 6" indicates that the user dictionary completely conforms to the standard dictionary. That is, all the hierarchical structures of the user dictionary are the same as the standard dictionary, and the property is also equal. Concretely, "Level 6C" indicates that all the hierarchical structures (including the properties) in the user dictionary are the same as those of the standard dictionary (see FIG. 18), and "Level 6E" indicates that some of the hierarchical structures (including the properties) in the user dictionary are the same as all the hierarchical structures of the standard dictionary (see FIG. 19).

<License Type>

FIG. 6 is an explanatory view of a license type in FIG. 4. The license type will be described hereinafter in detail. The license type is a permission level indicating a range of extension from the standard dictionary which is permitted during utilization, and can be a standard for selecting the charging level. There are five license types of "License 0" to "License 4", and product data of the types are as follows.

1) "License 0"

This "License 0" is a non-extension license indicating that any extension is not permitted and the existing standard dictionary has to be used as it is, and is substantially a partial assembly of the standard dictionary. Therefore, a combination with "License 1E", "License 2E", "License 3E", "License 4E", "License 5E", "License 6E" does not logically exist, and therefore the charging level itself does not exist.

2) "License 1"

This "License 1" indicates that a new value can be added to the existing property. Additionally, addition of a new class or a new property is prohibited by the license.

3) "License 2"

This "License 2" indicates that a new property can be added to the existing object. Additionally, the addition of a new class is prohibited by the license.

4) "License 3"

This "License 3" indicates that the object of a lowermost class is further classified, and the component class can be added. When a new component class is prepared, definition of the property for the class is also included in the license.

5) "License 4"

This "License 4" indicates that the component class can be prepared in an arbitrary class other than the lowermost component class. Additionally, if the component class is inadvertently added to the arbitrary class, the user dictionary is possibly far different from the standard dictionary, and a fear of nonconformity is large. Therefore, the charged amount is set to be a highest level in order to inhibit the utilization in an implication.

A data structure of supplier information will next be described.

<Data Structure of Supplier Information>

FIG. 7 is an explanatory view of the data structure of supplier information managed by the supplier information management DB 7 in FIG. 1. Here, information such as an applicant name, supplier code, dictionary conformity level, dictionary extension license, conforming start class name, and applicant information/obtained date/address/contact address are registered in order of acceptance of the application.

As described above, besides the supplier code issued by the charging level generation server 4 in the system of the present embodiment, various information on the user having filed the application can be added and managed in order to manage the supplier code. Moreover, for the user having a large degree of freedom in extension "License 3", "License 4", the component class name at which the conforming starts is also described, and registered as the information.

An example in which the user dictionary can change depending upon the conformity level will next be described.

Conformity with "Level 1C"

Figure 8:
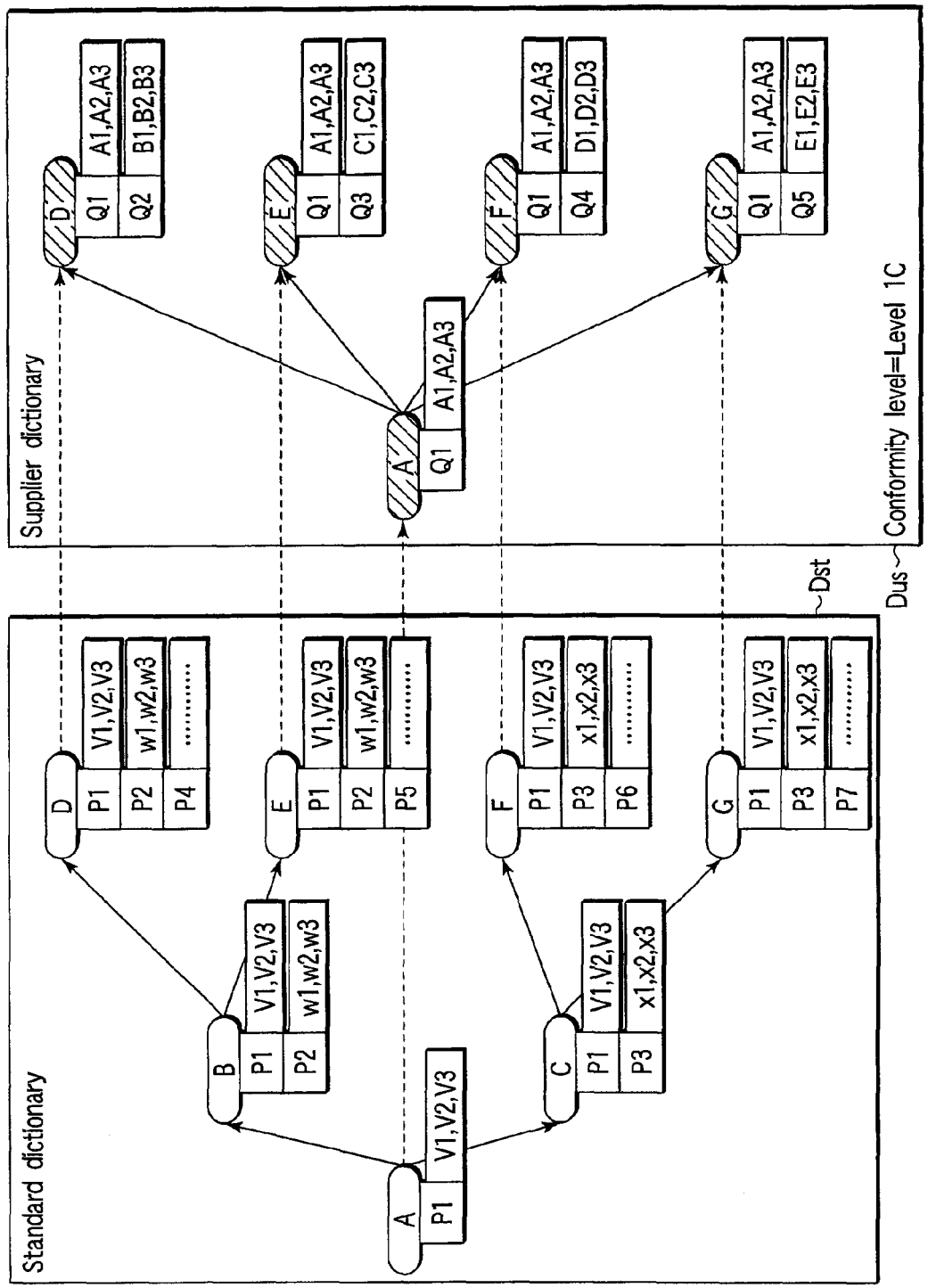
FIG. 8 is a diagram showing an example of conformity with Level 1C in FIG. 5.

FIG. 8 is a diagram showing an example of the user dictionary in conformity with "Level 1C" in FIG. 5. The conformity level "Level 1" indicates the user dictionary conforms to the standard dictionary only with respect to the terms, and the suffix is "C". Therefore, the example of conformity "Level 1C" described herein indicates that "all the terms in the user dictionary are equal to the terms of the standard dictionary in the definition". That is, in this level, as shown in FIG. 8, the extension shown in the right-side supplier dictionary (user dictionary) Dus is permitted with respect to the left-side standard dictionary (standard catalog dictionary) Dst. In this case, in a hatched portion (portion in which the terms of the component class 33 are described), the terms meet with those used in the standard dictionary.

Example of Conformity "Level 1E"

Figure 9:
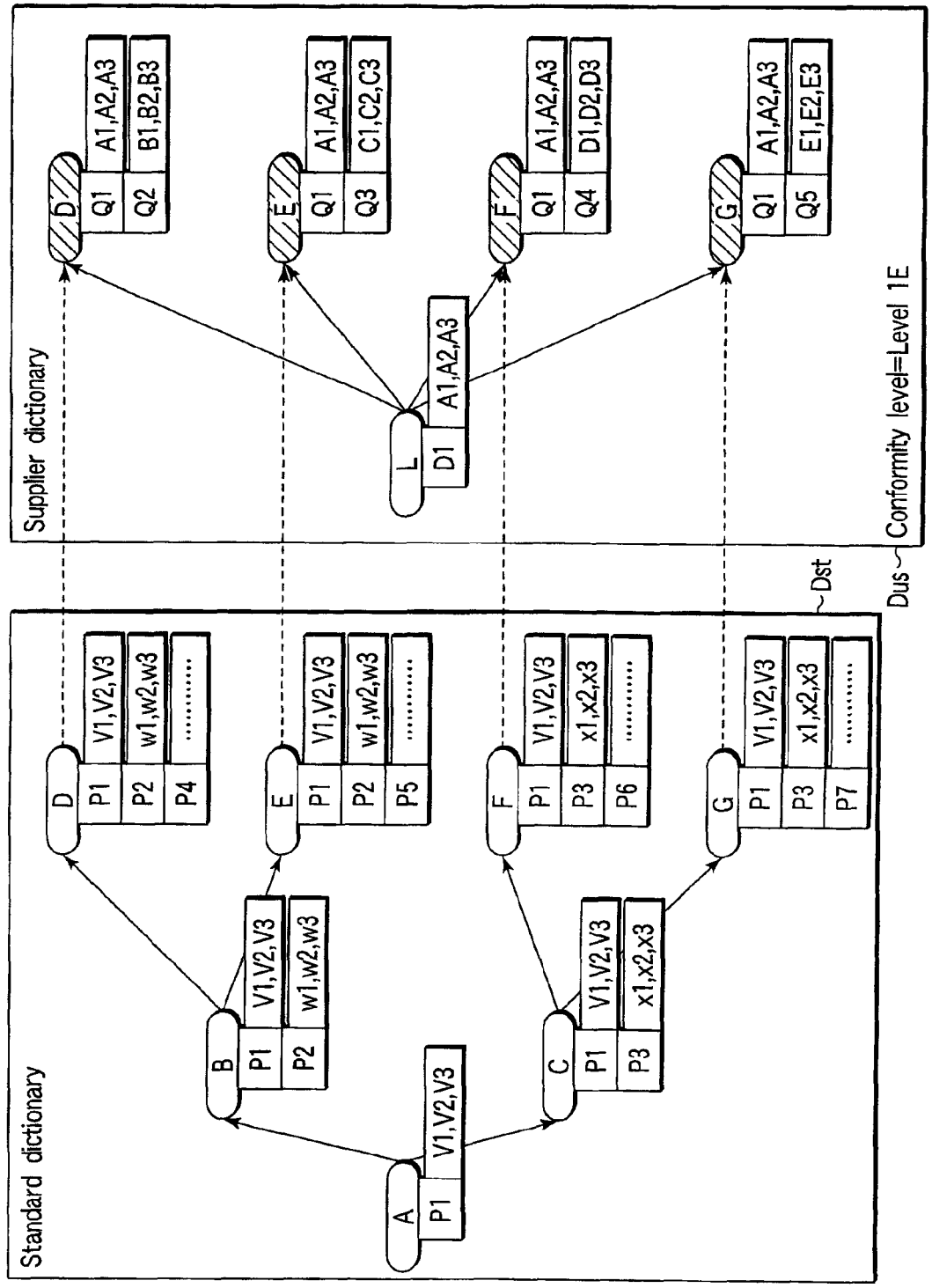
FIG. 9 is a diagram showing an example of conformity with Level 1E in FIG. 5.

FIG. 9 is a diagram showing an example of the user dictionary in conformity with "Level 1E" in FIG. 5. As described above, the conformity level "Level 1" indicates the user dictionary conforms to the standard dictionary only with respect to the terms, and the suffix is "E". Therefore, the example of "Level 1E" described herein indicates that "the terms in the user dictionary having names equal to those of the terms included in the standard dictionary have the equal definitions". That is, in this level, as shown in FIG. 9, the extension shown in the right-side supplier dictionary Dus is permitted with respect to the left-side standard dictionary Dst. In this case, in the hatched portion, the terms meet with those of the standard dictionary Dst. In the supplier dictionary Dus, the standard dictionary Dst is used to form even the "component class" 33, "property" 34, and "property value" 35.

Example of Conformity "Level 2C"

Figure 10:
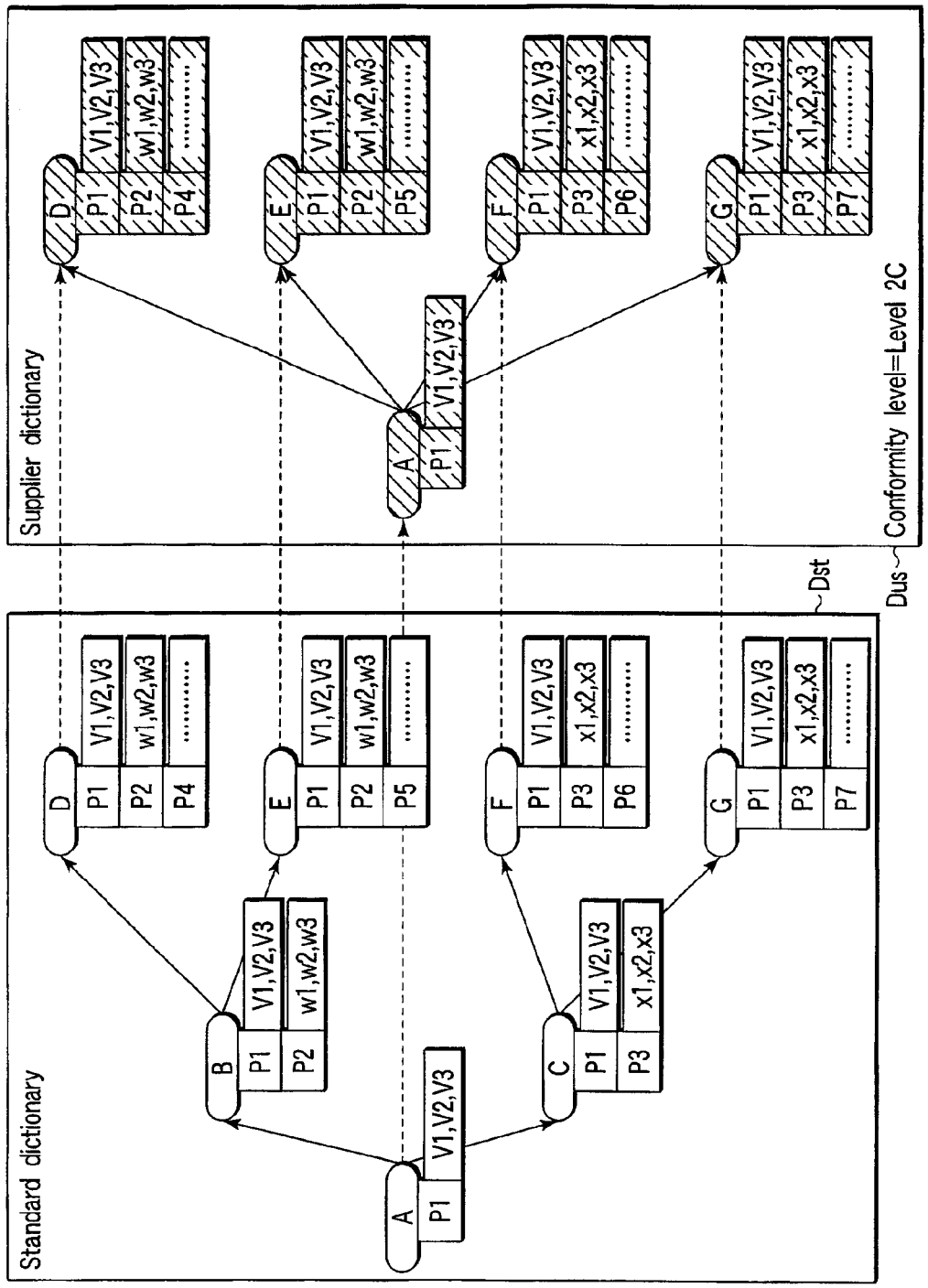
FIG. 10 is a diagram showing an example of conformity with Level 2C in FIG. 5.

FIG. 10 is a diagram showing an example of the user dictionary in conformity with "Level 2C" in FIG. 5. The conformity level "Level 2" indicates the user dictionary conforms to the standard dictionary only with respect to the single-unit object, and the suffix is "C". Therefore, the example of "Level 2C" described herein indicates that "all the objects in the user dictionary are equal to the objects of the standard dictionary in the definition". That is, in this level, as shown in FIG. 10, the extension shown in the right-side supplier dictionary Dus is permitted with respect to the left-side standard dictionary Dst. In this case, the hatched portion of the supplier dictionary meets with the standard dictionary Dst. It is seen that all the objects in the user dictionary, that is, the supplier dictionary Dus have the definitions equal to those of the objects of the standard dictionary Dst.

Example of Conformity "Level 2E"

Figure 11:
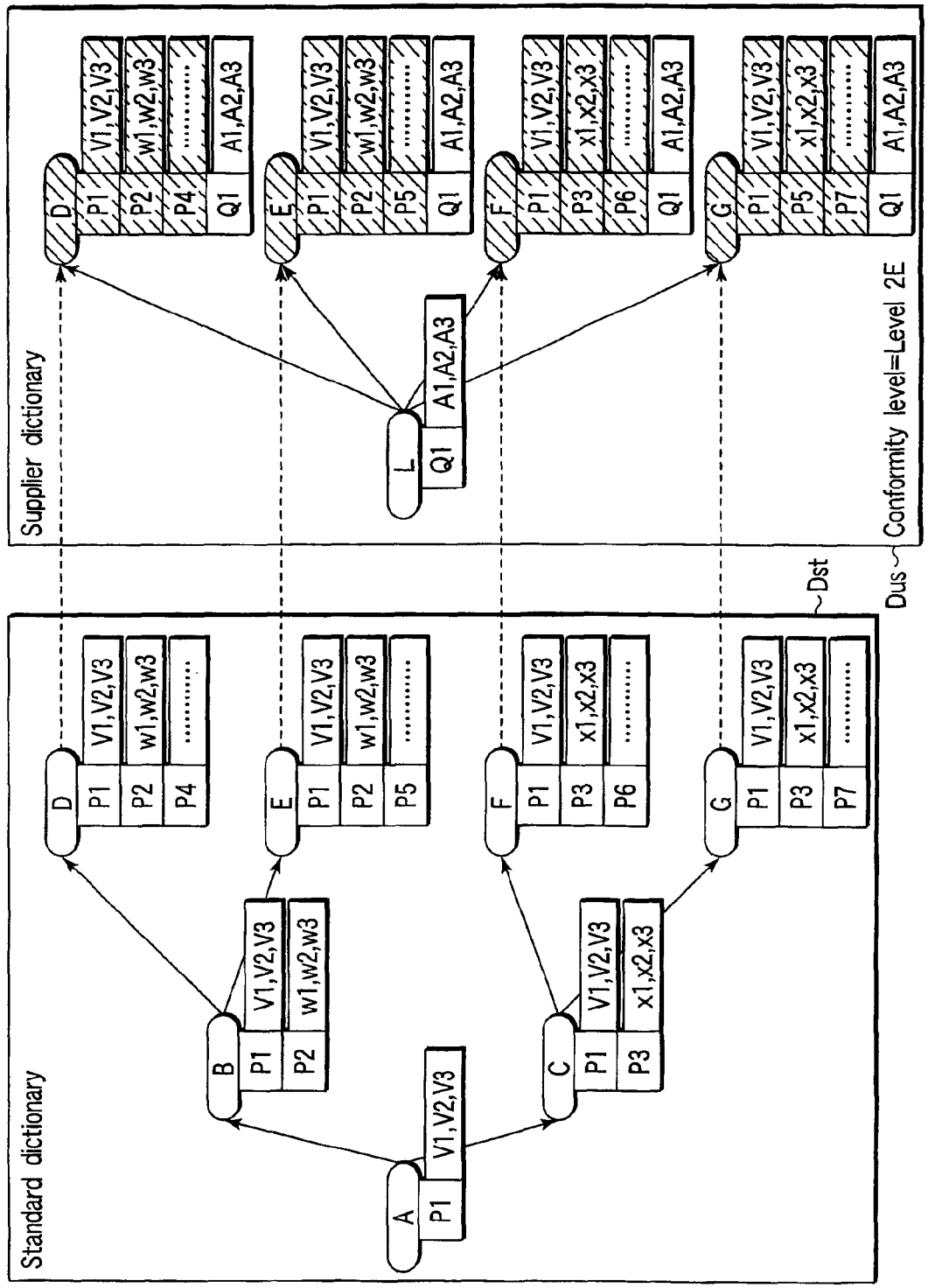
FIG. 11 is a diagram showing an example of conformity with Level 2E in FIG. 5.

FIG. 11 is a diagram showing an example of the user dictionary in conformity with "Level 2E" in FIG. 5. As described above, the conformity level "Level 2" indicates the user dictionary conforms to the standard dictionary only with respect to the single-unit object, and the suffix is "E". Therefore, the example of "Level 2E" described herein indicates that "the objects in the user dictionary and also included in the standard dictionary have equal definitions".

That is, in this level, as shown in FIG. 11, the extension shown in the right-side supplier dictionary Dus is permitted with respect to the left-side standard dictionary Dst. In this case, the hatched portion of the supplier dictionary meets with the standard dictionary Dst.

Example of Conformity "Level 3C"

Figure 12:
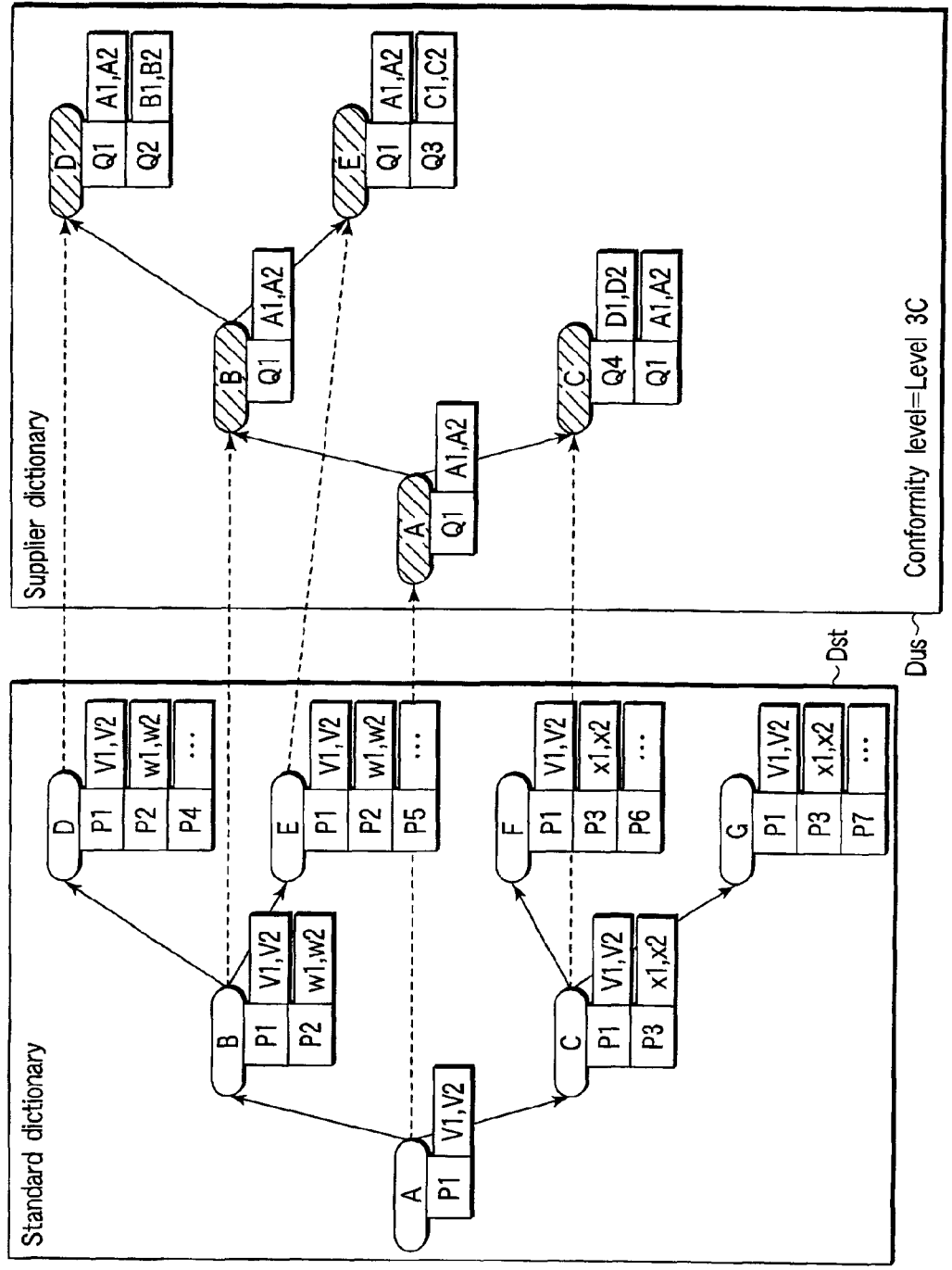
FIG. 12 is a diagram showing an example of conformity with Level 3C in FIG. 5.

FIG. 12 is a diagram showing an example of the user dictionary in conformity with "Level 3C" in FIG. 5. As described above, the conformity level "Level 3" indicates the user dictionary conforms to the standard dictionary only with respect to the partial hierarchy, and the suffix is "C". Therefore, the example of "Level 3C" described herein indicates that "all the hierarchical structures in the user dictionary are the same as some of the hierarchical structures of the standard dictionary". That is, in this level, as shown in FIG. 12, the extension shown in the right-side supplier dictionary Dus is permitted with respect to the left-side standard dictionary Dst. In this case, the hatched portion of the supplier dictionary meets with the standard dictionary Dst.

Example of Conformity "Level 3E"

Figure 13:
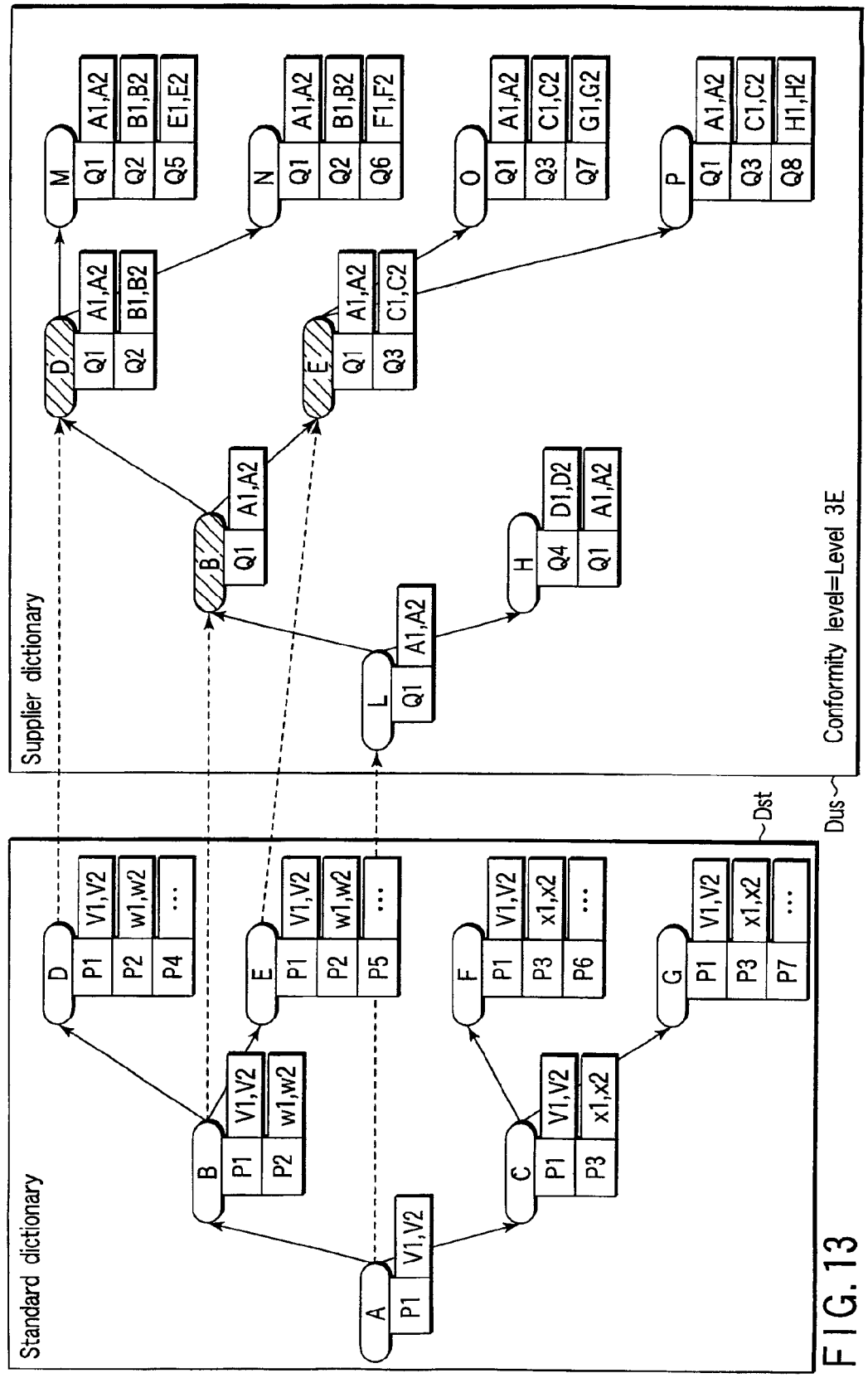
FIG. 13 is a diagram showing an example of conformity with Level 3E in FIG. 5.

FIG. 13 is a diagram showing an example of the user dictionary in conformity with "Level 3E" in FIG. 5. As described above, the conformity level "Level 3" indicates the user dictionary conforms to the standard dictionary only with respect to the partial hierarchy, and the suffix is "E". Therefore, the example of "Level 3E" described herein indicates that "some of the hierarchical structures in the user dictionary are the same as some of the hierarchical structures of the standard dictionary". That is, in this level, as shown in FIG. 13, the extension shown in the right-side supplier dictionary Dus is permitted with respect to the left-side standard dictionary Dst. In this case, the hatched portion of the supplier dictionary meets with the standard dictionary Dst.

Example of Conformity "Level 4C"

Figure 14:
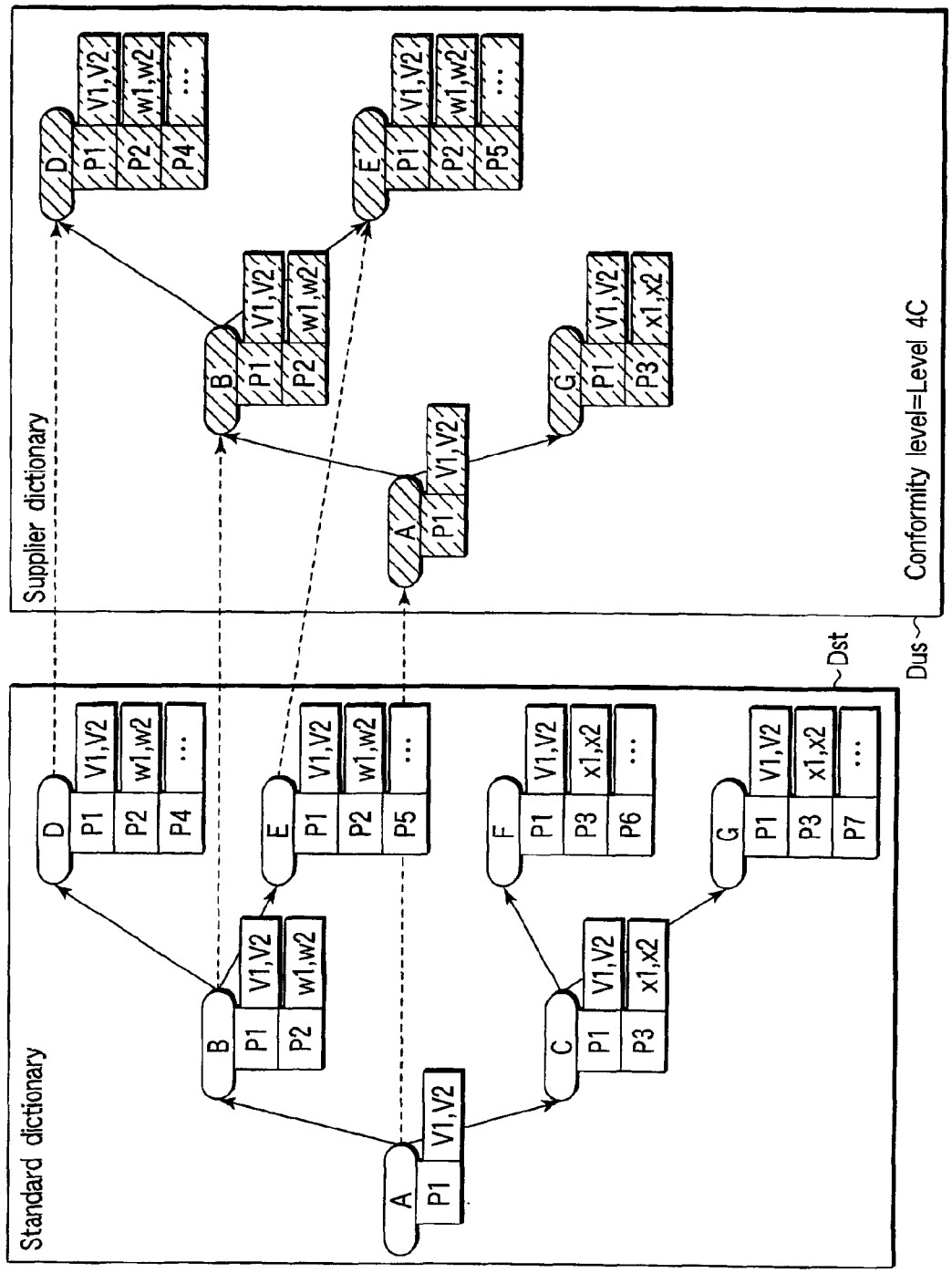
FIG. 14 is a diagram showing an example of conformity with Level 4C in FIG. 5.

FIG. 14 is a diagram showing an example of the user dictionary in conformity with "Level 4C" in FIG. 5. As described above, the conformity level "Level 4" indicates the user dictionary conforms to the standard dictionary only with respect to the partial hierarchical object, and the suffix is "C". Therefore, the example of "Level 4C" described herein indicates that "all the hierarchical structures (including the properties) in the user dictionary are the same in level as some of the hierarchical structures of the standard dictionary". That is, in this level, as shown in FIG. 14, the extension shown in the right-side supplier dictionary Dus is permitted with respect to the left-side standard dictionary Dst. In this case, the hatched portion of the supplier dictionary meets with the standard dictionary Dst.

Example of Conformity "Level 4E"

Figure 15:
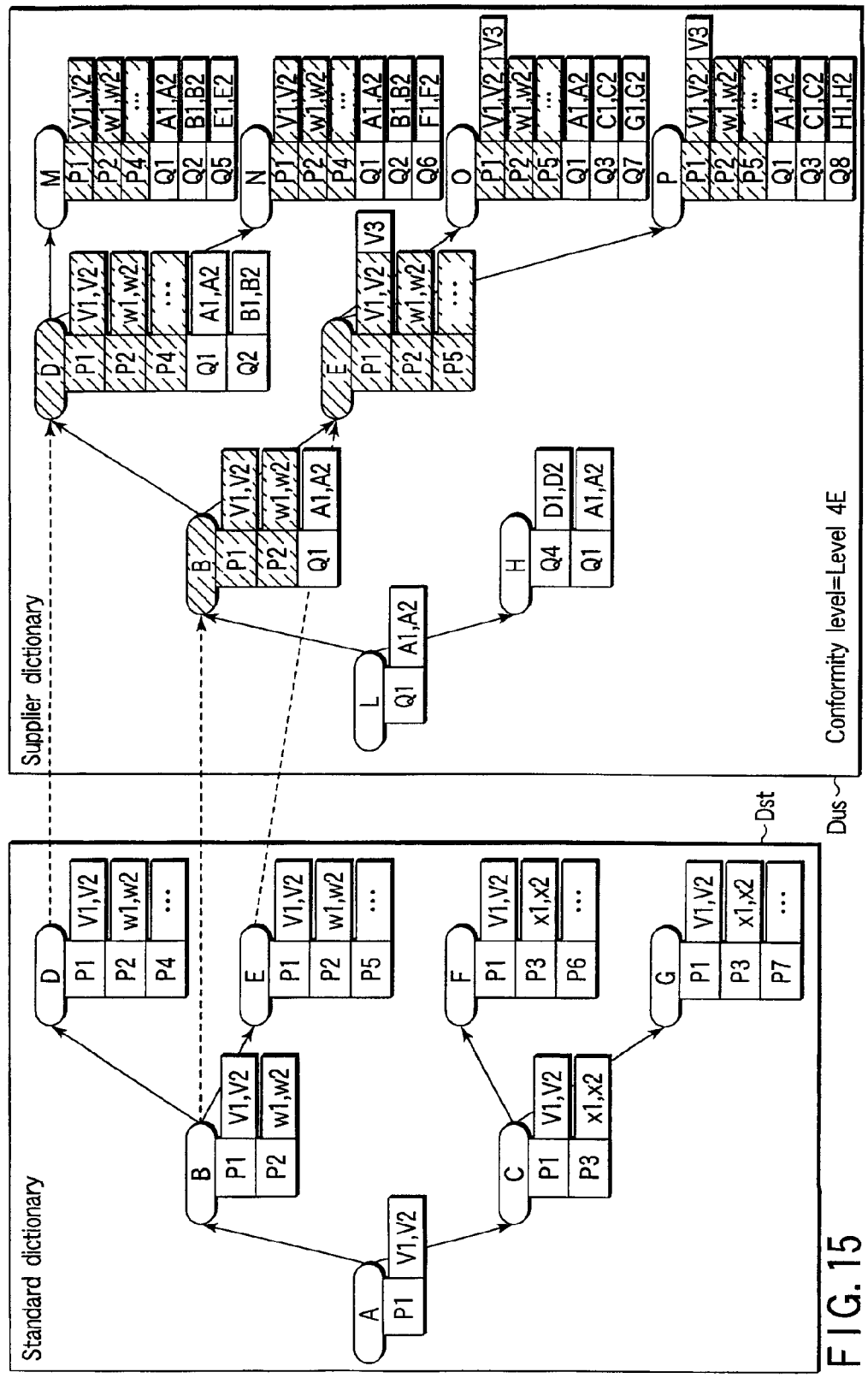
FIG. 15 is a diagram showing an example of conformity with Level 4E in FIG. 5.

FIG. 15 is a diagram showing an example of the user dictionary in conformity with "Level 4E" in FIG. 5. As described above, the conformity level "Level 4" indicates the user dictionary conforms to the standard dictionary only with respect to the partial hierarchical object, and the suffix is "E". Therefore, the example of "Level 4E" described herein indicates that "some of the hierarchical structures (including the properties) in the user dictionary are the same in level as some of the hierarchical structures of the standard dictionary". That is, in this level, as shown in FIG. 15, the extension shown in the right-side supplier dictionary Dus is permitted with respect to the left-side standard dictionary Dst. In this case, the hatched portion of the supplier dictionary meets with the standard dictionary Dst.

Example of Conformity "Level 5C"

Figure 16:
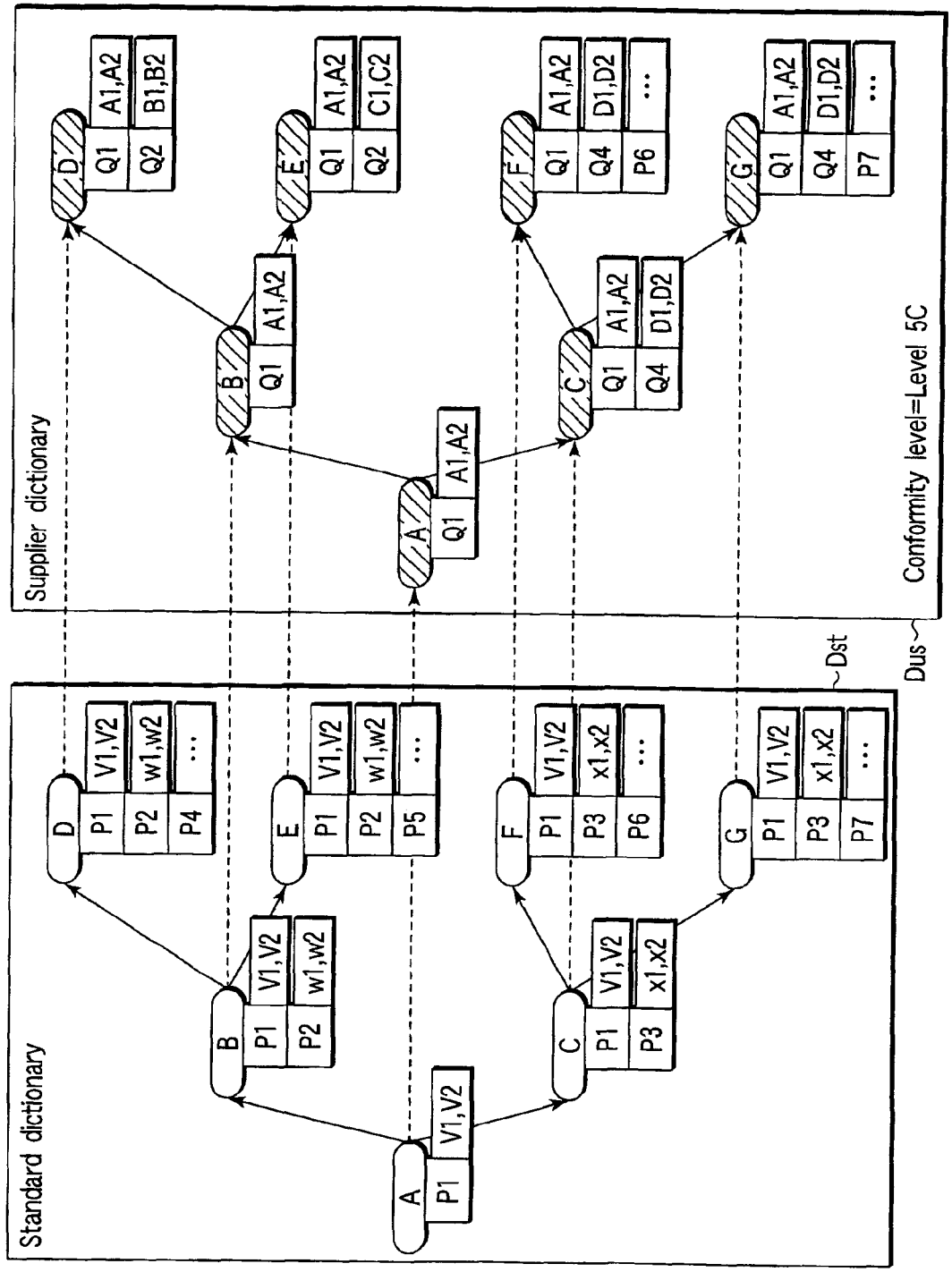
FIG. 16 is a diagram showing an example of conformity with Level 5C in FIG. 5.

FIG. 16 is a diagram showing an example of the user dictionary in conformity with "Level 5C" in FIG. 5. As described above, the conformity level "Level 5" indicates the user dictionary conforms to the standard dictionary with respect to the whole hierarchy, and the suffix is "C". Therefore, the example of "Level 5C" described herein indicates that "all the hierarchical structures in the user dictionary are the same in level as all the hierarchical structures of the standard dictionary". That is, in this level, as shown in FIG. 16, the extension shown in the right-side supplier dictionary is permitted with respect to the left-side standard dictionary. In this case, the hatched portion of the supplier dictionary meets with the standard dictionary.

Example of Conformity "Level 5E"

Figure 17:
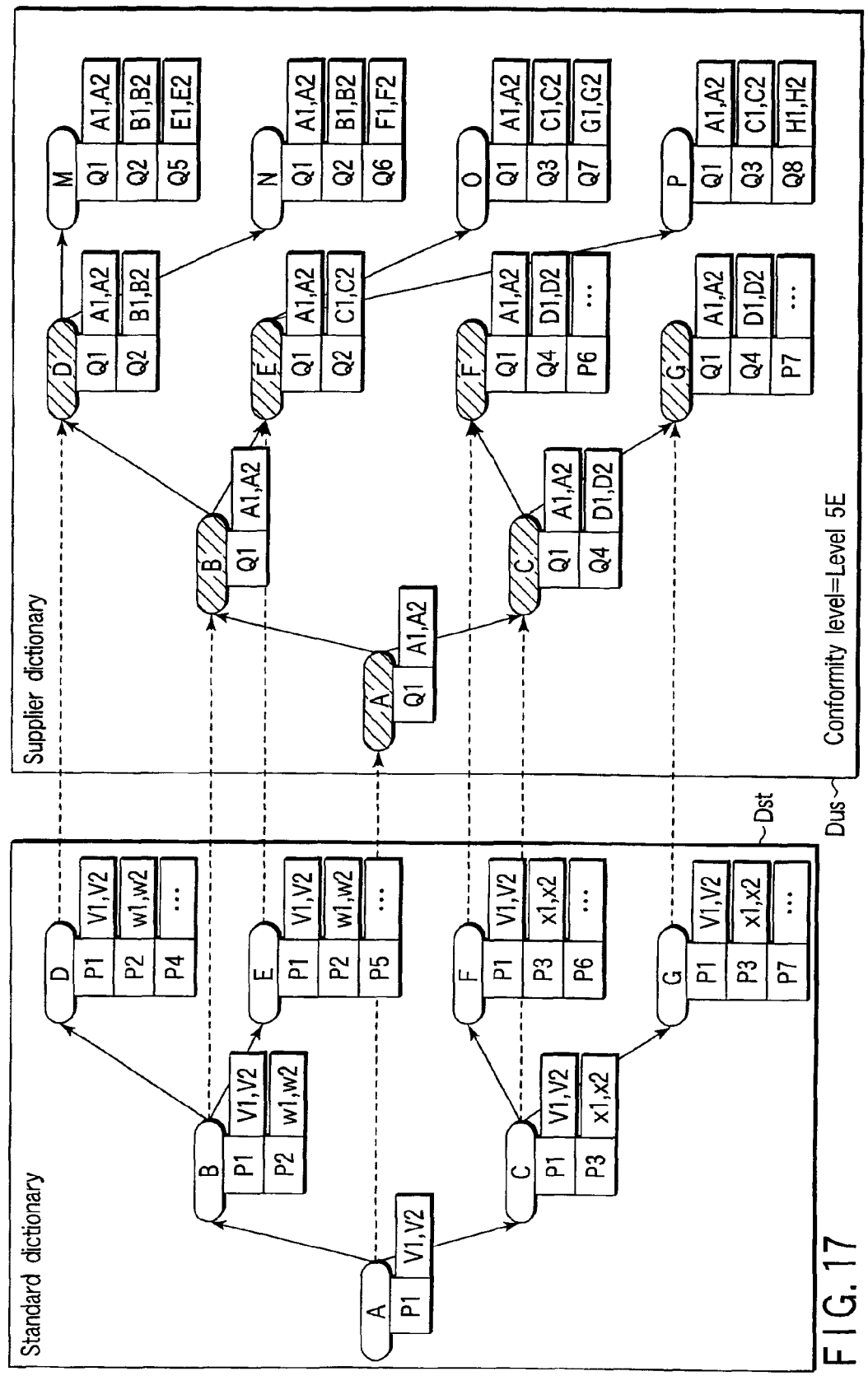
FIG. 17 is a diagram showing an example of conformity with Level 5E in FIG. 5.

FIG. 17 is a diagram showing an example of the user dictionary in conformity with "Level 5E" in FIG. 5. As described above, the conformity level "Level 5" indicates the user dictionary conforms to the standard dictionary with respect to the whole hierarchy, and the suffix is "E". Therefore, the example of "Level 5E" described herein indicates that "some of the hierarchical structures in the user dictionary are the same in level as all the hierarchical structures of the standard dictionary". That is, in this level, as shown in FIG. 17, the extension shown in the right-side supplier dictionary Dus is permitted with respect to the left-side standard dictionary Dst. In this case, the hatched portion of the supplier dictionary meets with the standard dictionary Dst.

Example of Conformity "Level 6C"

Figure 18:
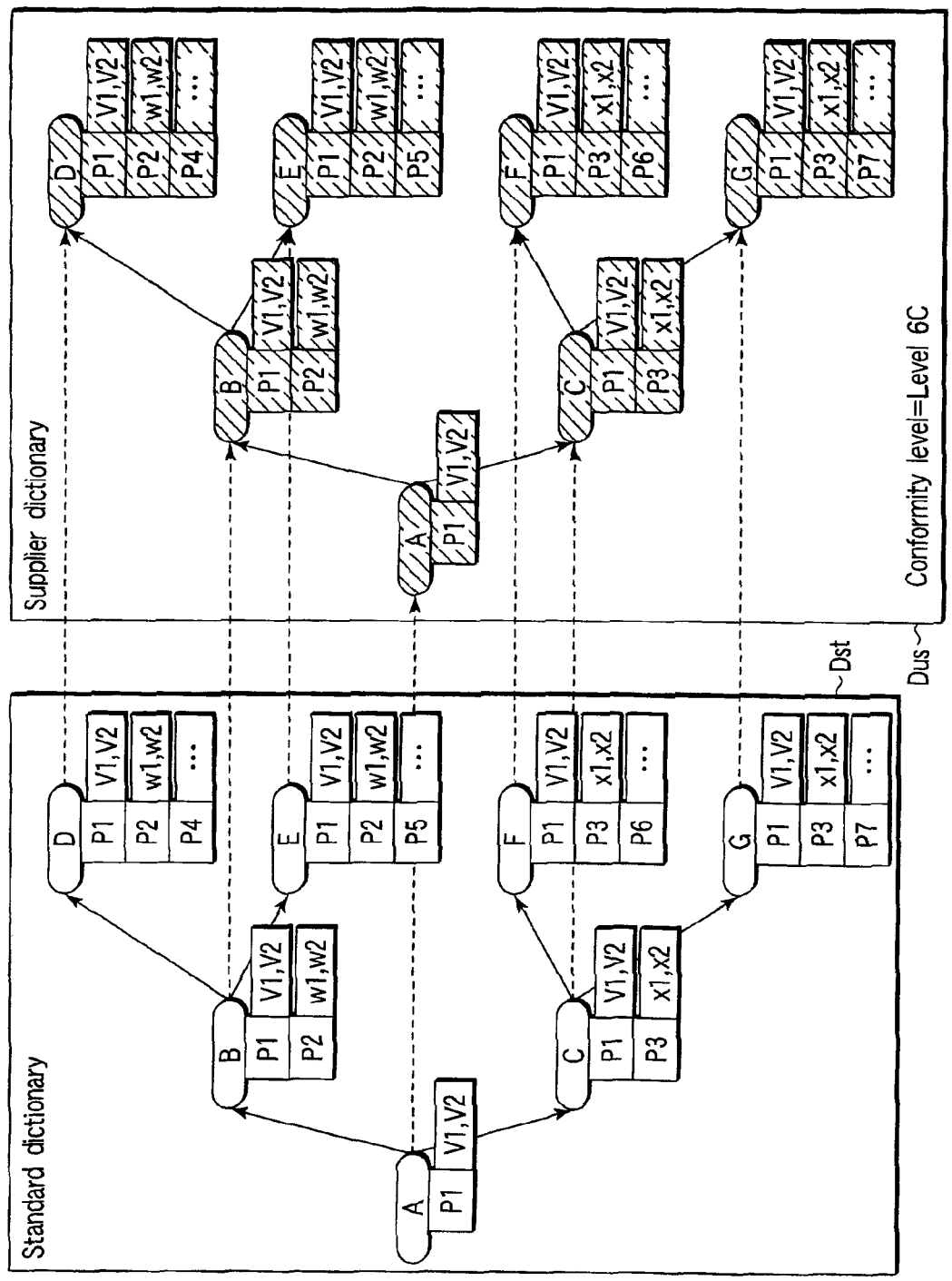
FIG. 18 is a diagram showing an example of conformity with Level 6C in FIG. 5.

FIG. 18 is a diagram showing an example of the user dictionary in conformity with "Level 6C" in FIG. 5. As described above, the conformity level "Level 6" indicates the user dictionary entirely conforms to the standard dictionary, and the suffix is "C". Therefore, the example of "Level 6C" described herein indicates that "all the hierarchical structures (including the properties) in the user dictionary are the same in level as all the hierarchical structures of the standard dictionary". That is, in this level, as shown in FIG. 18, the extension shown in the right-side supplier dictionary Dus is permitted with respect to the left-side standard dictionary Dst. In this case, the hatched portion of the supplier dictionary meets with the standard dictionary Dst.

Example of Conformity "Level 6E"

Figure 19:
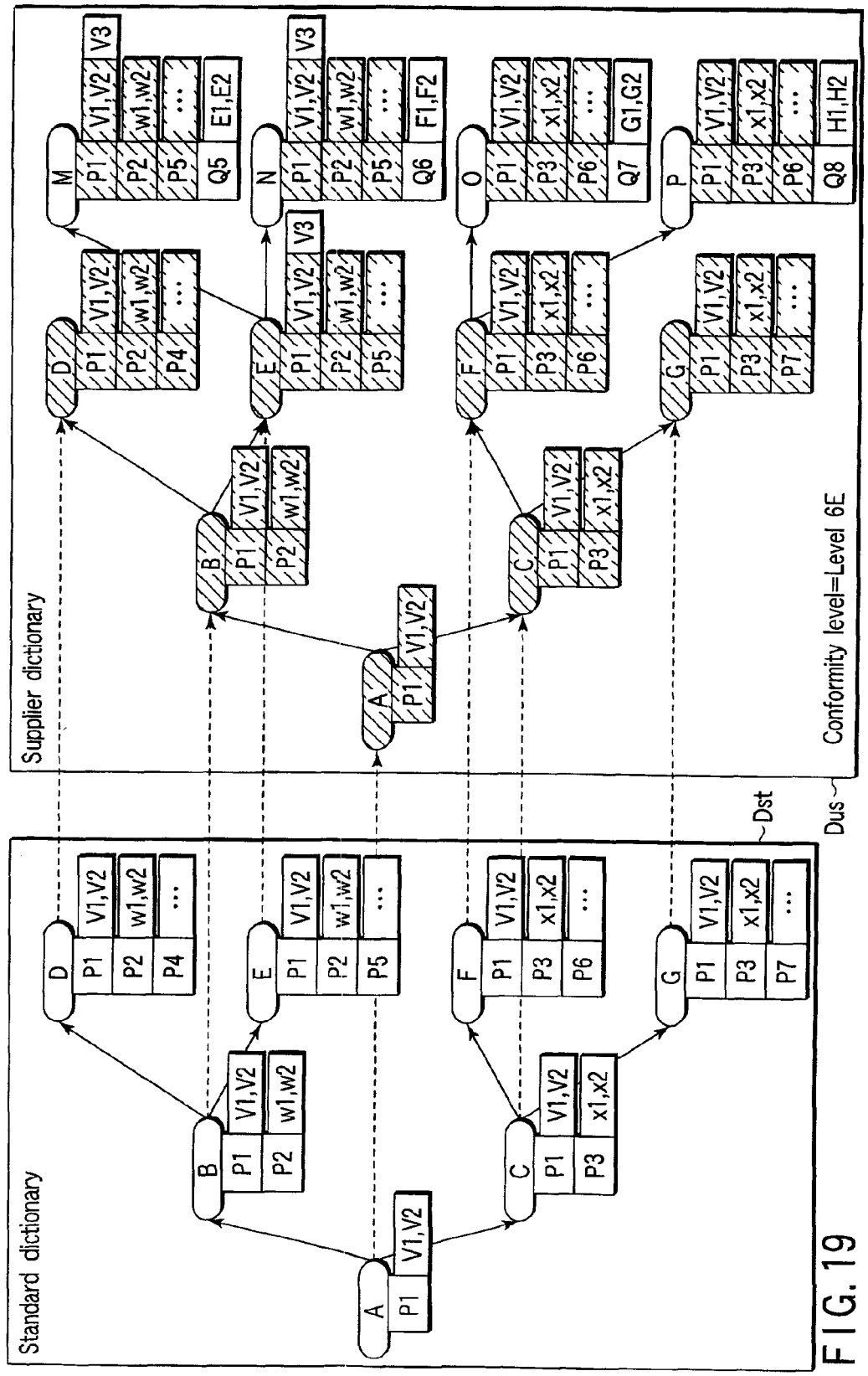
FIG. 19 is a diagram showing an example of conformity with Level 6E in FIG. 5.

FIG. 19 is a diagram showing an example of the user dictionary in conformity with "Level 6E" in FIG. 5. As described above, the conformity level "Level 6" indicates the user dictionary entirely conforms to the standard dictionary, and the suffix is "E". Therefore, the example of "Level 6E" described herein indicates that "some of the hierarchical structures (including the properties) in the user dictionary are the same in level as all the hierarchical structures of the standard dictionary". That is, in this level, as shown in FIG. 19, the extension shown in the right-side supplier dictionary Dus is permitted with respect to the left-side standard dictionary Dst. In this case, the hatched portion of the supplier dictionary meets with the standard dictionary Dst.

When a certain user uses the electronic catalog system of the international standards to prepare and provide the electronic catalog of the user's company in this manner, the user (supplier who desires to open the product data) executes a procedure for filing the application for the license with respect to the window system of the management operation organization.

Then, the window system checks the conformity level of the catalog product data prepared by the user with respect to the standard dictionary from the application content, grants the license in accordance with the conformity level, also grants the verification program corresponding to the conformity level, and charges a fee for the granted license.

The user verifies the user dictionary used in the catalog product data developed by the user with the granted verification program, and obtains an approval of the conformity level.

The conformity level of the catalog product data presented from the user having received the license is secured in accordance with the licensed content and the quality can be maintained.

The fee is charged in accordance with the license content. For example, when the conformity level is high, the fee is set to be small. The operation for charging the fee in such fee system is realized. The supply of the catalog product data is naturally induced so that the catalog product data are in conformity with the standard dictionary.

Therefore, an environment can be constructed in which extended versions are inhibited from being rampantly distributed and the catalog product data in conformity with the standard dictionary are broadly distributed.

[Conformity Level Verification Program]

FIGS. 20 to 31 are flowcharts showing processing procedures of programs for evaluating the respective conformity levels stored in the conformity level verification program in FIG. 1. When the user prepares the user's electronic catalog, and starts to present the information to the outside, the user needs to use these programs to verify the user catalog dictionary. When the user passes through the verification, the user can establish the conformity level and display a quality level of the user dictionary. The respective processing procedures will be described hereinafter.

Processing Procedure of "Level 1C" Verification Program

Figure 20:
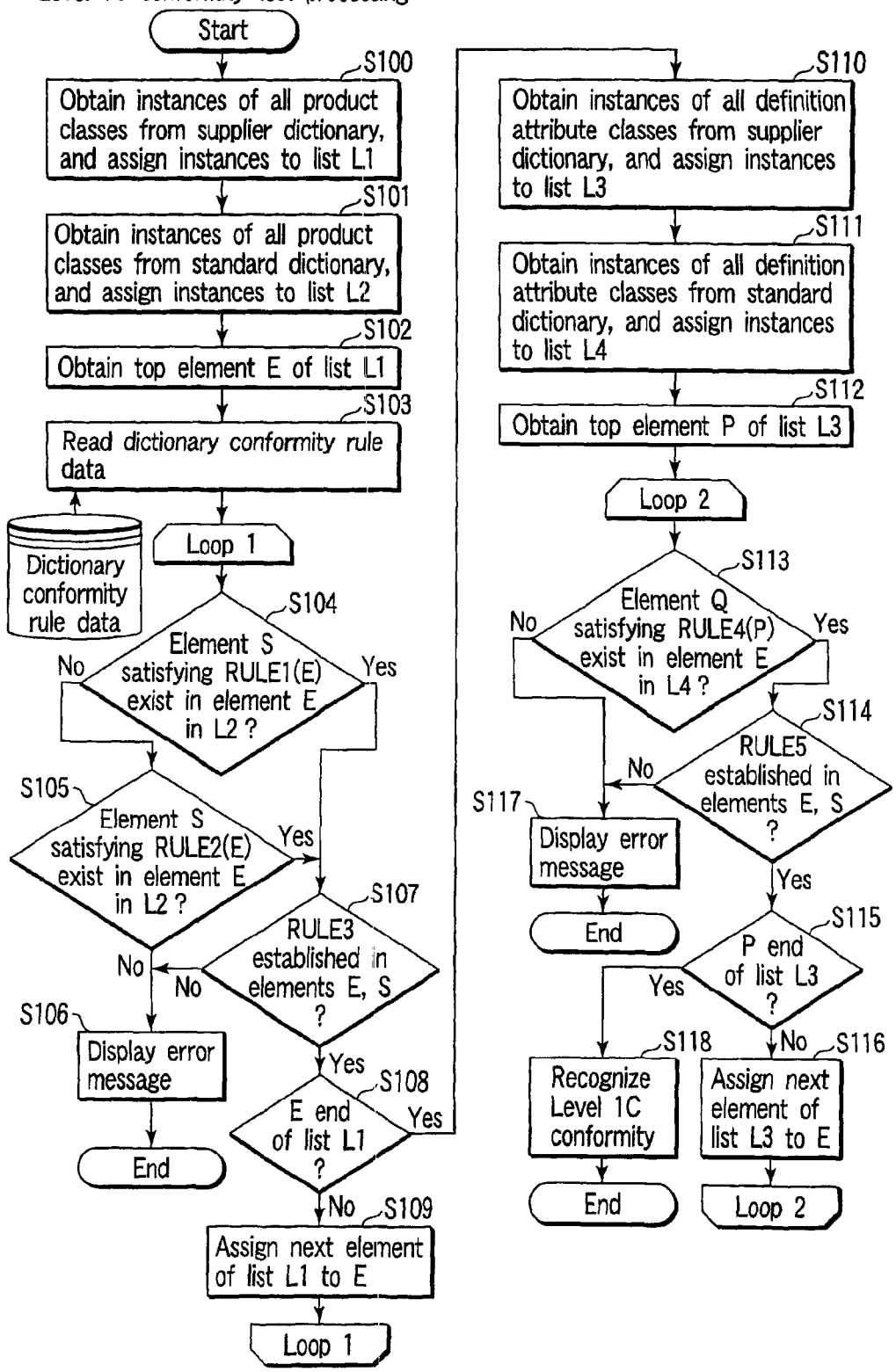
FIG. 20 is a flowchart showing a processing procedure of a program for verifying Level 1C included in a conformity level verification program 6 in the configuration of FIG. 1.

FIG. 20 is a flowchart showing the processing procedure of the program for verifying "Level 1C" included in the conformity level verification program 6 in FIG. 1. The verification is performed using "RULE2", "RULE3", "RULE4", "RULE5" stored in dictionary conformity rule data shown in FIG. 32. First, identity is verified with respect to the component class of the user catalog dictionary (supplier dictionary) and standard dictionary (S100 to S109), and subsequently the identity is verified with respect to both properties (S111 to S118).

In this level, when there is even one disagreement in the supplier dictionary, an error occurs.

This respect will be described in more detail. Instances of all the component classes are obtained from the supplier dictionary, and assigned to a list L1 (step S100). Subsequently, the instances of all the component classes are obtained from the standard dictionary, and assigned to a list L2 (step S101). Next, a top element E of the list L1 is obtained (step S102). The dictionary conformity rule data is then read (step S103).

Subsequently, it is checked whether or not an element S satisfying "RULE1" exists in the element E in L2 (step S104).

When the element S does not exist as a result of the check in the step S104, it is checked whether or not an element S satisfying "RULE2" exists in the element E in L2 (step S105). Moreover, when the element S exists as a result of the check in the step S104, it is checked whether or not "RULE3" is established in the elements E and S (step S107).

When the element does not exist as a result of the check in the step S105, an error message is displayed (step S106), and the processing ends. However, when the element exists, the processing shifts to step S107.

It is checked in the step S107 whether or not "RULE3" is established in the elements E and S. When the rule is not established as a result, the error message is displayed (step S106), and the processing ends. When the rule is established, it is checked whether or not the element E is an end of the list L1 (step S108). When the element is not the end, the next element of the list L1 is assigned to E, and the processing is again executed from the step S104.

When the element E is the end of the list L1 as a result of the check in the step S108, the processing shifts to the next step S110. Instances of all property classes are obtained from the supplier dictionary, and assigned to a list L3. Subsequently, the instances of all the property classes are obtained from the standard dictionary, and assigned to a list L4 (step S111). Next, a top element P of the list L3 is obtained (step S112). Subsequently, it is checked whether or not an element Q satisfying "RULE4" exists in the element E in L4 (step S113).

When the element does not exist as a result of the check in the step S113, the error message is displayed (step S117), and the processing ends. However, when the element exists, the processing shifts to step S114.

It is checked in the step S114 whether or not "RULE5" is established in the elements E and S. When the rule is not established as a result, the error message is displayed (step S117), and the processing ends. When the rule is established, the processing shifts to step S115. It is checked in the step S115 whether or not the element P of the list L3 being processed is the end of the list L3. Subsequently, when the element is not the end as a result of the check, the element of the list L3 is assigned to E (step S116), and the processing in and after the step S113 is repeated. However, when the element is the end, "Level 1C" is determined (step S118), and the processing ends.

When "Level 1C" is determined as a result of the processing, the supplier can display the checked supplier dictionary presented by the supplier itself as the "Level 1C" conformity.

Processing Procedure of "Level 1E" Verification Program

Figure 21:
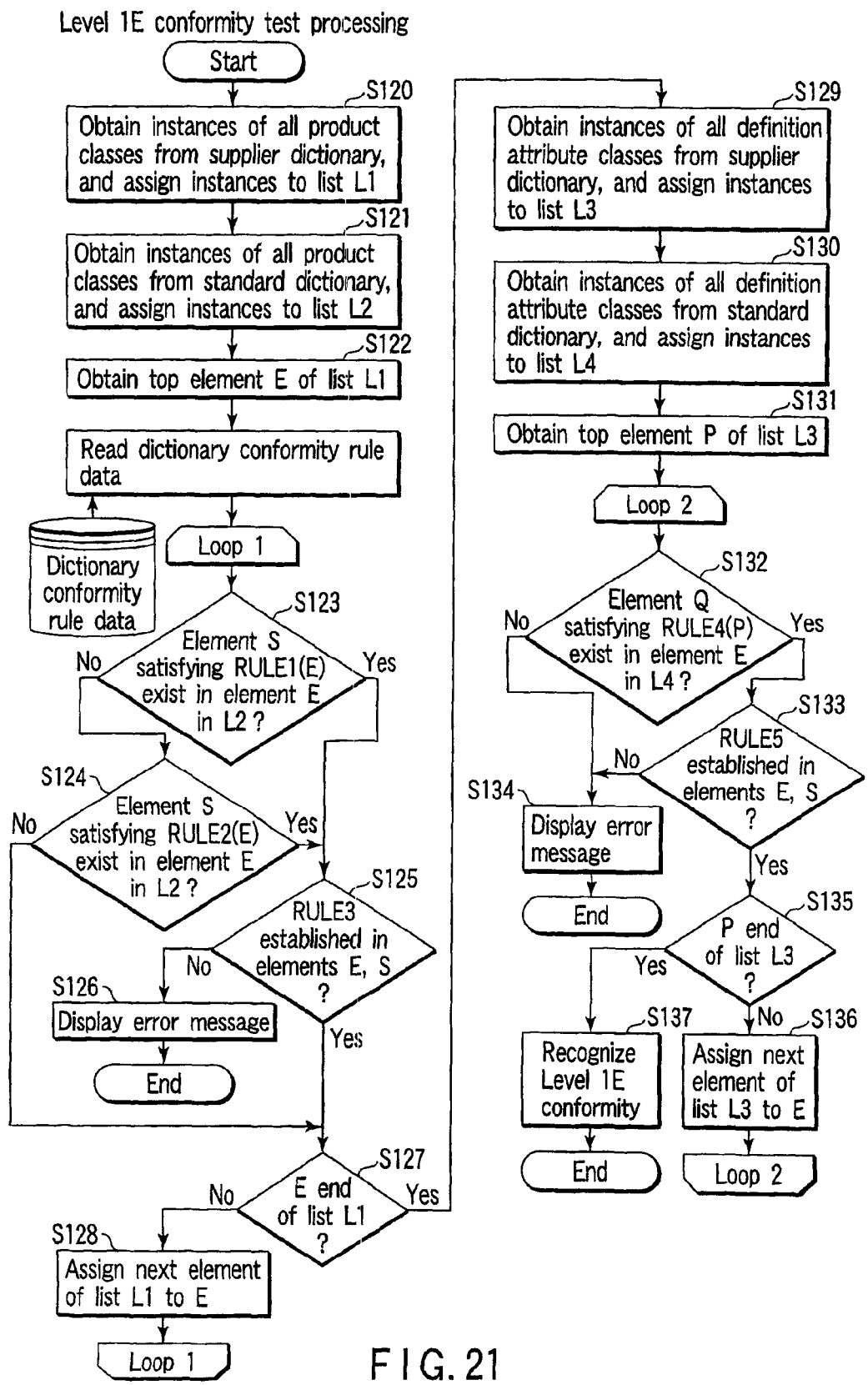
FIG. 21 is a flowchart showing a processing procedure of a program for verifying Level 1E included in the conformity level verification program 6 in the configuration of FIG. 1.

FIG. 21 is a flowchart showing the processing procedure of the program for verifying "Level 1E" included in the conformity level verification program 6 in FIG. 1. The verification is performed using "RULE1", "RULE2", "RULE3", "RULE4", "RULE5" stored in the dictionary conformity rule data shown in FIG. 32. First, the identity is verified with respect to the "component class" of the user catalog dictionary (supplier dictionary) and the standard dictionary (S120 to S128), and subsequently the identity is verified with respect to both properties (S129 to S137).

In this level, if there is a term not-included in the standard dictionary and present only in the supplier dictionary, the term is skipped. When there is the term (identical term) also included in the standard dictionary, and there is a difference of definition between the standard dictionary and the supplier dictionary, the error occurs.

This respect will be described in more detail. The instances of all the component classes are obtained from the supplier dictionary, and assigned to the list L1 (step S120). Subsequently, the instances of all the component classes are obtained from the standard dictionary, and assigned to the list L2 (step S121). Next, the top element E of the list L1 is obtained (step S122). The dictionary conformity rule data is then read (step S119).

Subsequently, it is checked whether or not the element S satisfying "RULE1" exists in the element E in L2 (step S123).

When the element does not exist as a result of the check in the step S123, it is checked whether or not the element S satisfying "RULE2" exists in the element E in L2 (step S124). Moreover, when the element exists as a result of the check in the step S123, it is checked whether or not "RULE3" is established in the elements E and S (step S125).

When the rule is not established as a result of the check in the step S125, the error message is displayed (step S126), and the processing ends. However, when the rule is established, the processing shifts to step S127.

On the other hand, when the element exists as a result of the check in the step S124, the processing shifts to the step S127. However, when the element does not exist, the processing shifts to the step S125. Subsequently, it is checked in the step S125 whether or not "RULE3" is established in the elements E and S. When the rule is not established as a result, the error message is displayed (step S126), and the processing ends. When the rule is established, the processing shifts to step S127.

It is checked in the step S127 whether or not the element E is the end of the list L1. When the element is not the end, the next element of the list L1 is assigned to E (step S128), and the processing is again executed from the step S123.

On the other hand, when the element E is the end of the list L1 as a result of the check in the step S127, the processing shifts to the next step S129. The instances of all property classes are obtained from the supplier dictionary, and assigned to the list L3. Subsequently, the instances of all the property classes are obtained from the standard dictionary, and assigned to the list L4 (step S130). Next, the top element P of the list L3 is obtained (step S131).

Subsequently, it is checked whether or not the element Q satisfying "RULE4" exists in the element E in L4 (step S132).

When the element does not exist as a result of the check in the step S132, the processing shifts to step S135. However, when the element exists, the processing shifts to step S133 to check whether or not "RULE5" is established in the elements E, S. When the "RULE5" is not established as a result of the check in the step S133, the error message is displayed (step S134), and the processing ends. When the "RULE5" is established, the processing shifts to step S135.

It is checked in the step S135 whether or not the element P of the list L3 being processed is the end of the list L3. Subsequently, when the element is not the end as a result of the check, the element of the list L3 is assigned to E (step S136), and the processing in and after the step S132 is repeated. However, when the element is the end, "Level 1E" is recognized/determined (step S137), and the processing ends.

When "Level 1E" is determined as a result of the processing, the supplier can display the checked supplier dictionary presented by the supplier itself as the "Level 1E" conformity.

Processing Procedure of "Level 2C" Verification Program

Figure 22:
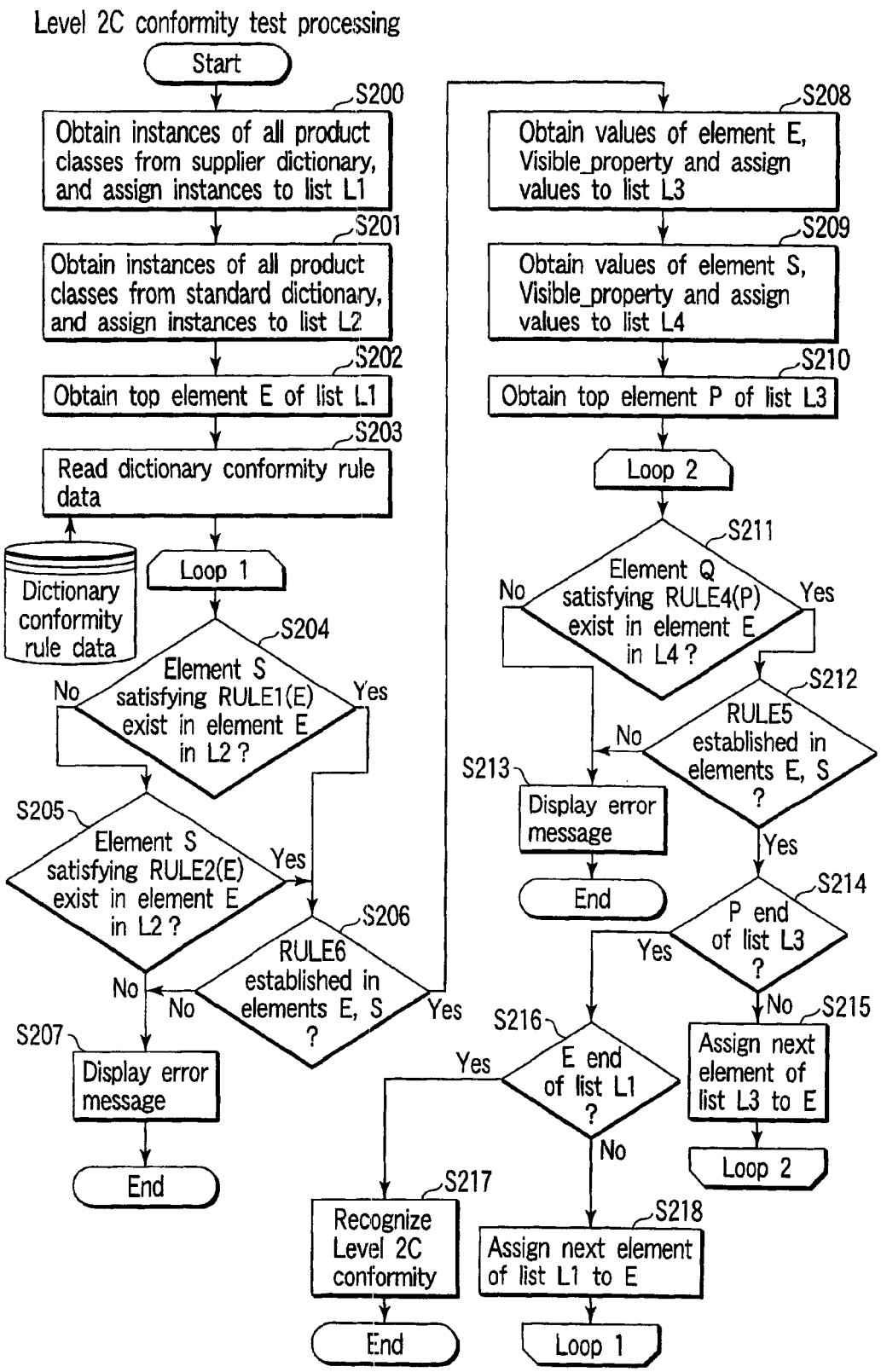
FIG. 22 is a flowchart showing a processing procedure of a program for verifying Level 2C included in the conformity level verification program 6 in the configuration of FIG. 1.

FIG. 22 is a flowchart showing the processing procedure of the program for verifying "Level 2C" included in the conformity level verification program 6 in FIG. 1. The verification is performed using "RULE1", "RULE2", "RULE6", "RULE4", "RULE5" stored in the dictionary conformity rule data shown in FIG. 32. First, the identity is verified with respect to the component class of the user catalog dictionary (supplier dictionary) and the standard dictionary (S200 to S207), and the identity is verified with respect to the properties possessed by the component classes (S208 to S218).

When there is even one disagreement in the supplier dictionary, the error occurs.

This respect will be described in more detail. The instances of all the component classes are obtained from the supplier dictionary, and assigned to the list L1 (step S200). Subsequently, the instances of all the component classes are obtained from the standard dictionary, and assigned to the list L2 (step S201). Next, the top element E of the list L1 is obtained (step S202). The dictionary conformity rule data is then read (step S203).

Subsequently, it is checked whether or not the element S satisfying "RULE1" exists in the element E in L2 (step S204).

When the element does not exist as a result of the check in the step S204, it is checked whether or not the element S satisfying "RULE2" exists in the element E in L2 (step S205). Moreover, when the element exists as a result of the check in the step S204, it is checked whether or not "RULE6" is established in the elements E and S (step S206).

When the element does not exist as a result of the check in the step S205, the error message is displayed (step S207), and the processing ends. However, when the element exists, the processing shifts to step S206.

It is checked in the step S206 whether or not "RULE6" is established in the elements E and S. When the rule is not established as a result, the error message is displayed (step S207), and the processing ends. When the rule is established, the processing shifts to step S208.

In the step S208, values of the element E, Visible_property are obtained, and assigned to the list L3. Subsequently, values of the element S, Visible_property are obtained, and assigned to the list L4 (step S209). Subsequently, the top element P of the list L3 is obtained (step S210).

Subsequently, it is checked whether or not the element Q satisfying "RULE4" exists in the element E in L4 (step S211).

When the element does not exist as a result of the check in the step S211, the error message is displayed (step S213), and the processing ends. However, when the element exists, the processing shifts to step S212.

It is checked in the step S212 whether or not "RULE5" is established in the elements E, S. When the rule is not established as a result, the error message is displayed (step S213), and the processing ends. When the rule is established, the processing shifts to step S214. It is checked in the step S214 whether or not the element P of the list L3 being processed is the end of the list L3. Subsequently, when the element is not the end as a result of the check, the element of the list L3 is assigned to E (step S215), and the processing in and after the step S211 is repeated. However, when the element is the end, it is checked whether or not the element E is the end of the list L1 (step S216).

Subsequently, when the element is not the end, the next element of the list L3 is assigned to E (step S218), and the processing in and after the step S211 is repeated. However, when the element is the end, "Level 2C" is recognized/determined (step S217), and the processing ends.

When "Level 2C" is determined as a result of the processing, the supplier can display the checked supplier dictionary presented by the supplier itself as the "Level 2C" conformity.

Processing Procedure of "Level 2E" Verification Program

Figure 23:
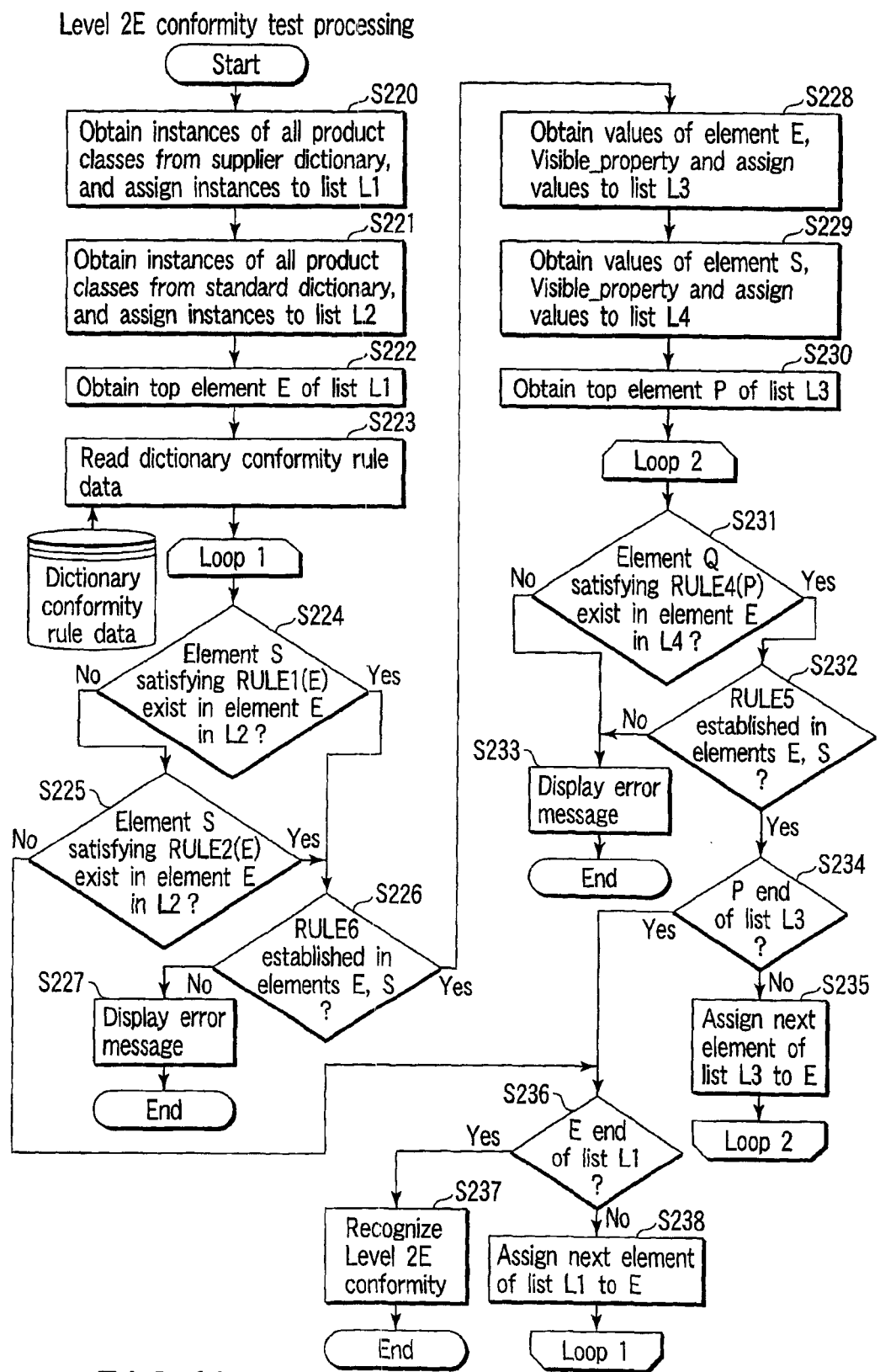
FIG. 23 is a flowchart showing a processing procedure of a program for verifying Level 2E included in the conformity level verification program 7 in the configuration of FIG. 1.

FIG. 23 is a flowchart showing the processing procedure of the program for verifying "Level 2E" included in the conformity level verification program 6 in FIG. 1. The verification is performed using "RULE1", "RULE2", "RULE6", "RULE4", "RULE5" stored in the dictionary conformity rule data shown in FIG. 32. First, the identity is verified with respect to the component class of the user catalog dictionary (supplier dictionary) and the standard dictionary (S220 to S227), and the identity is verified with respect to the properties possessed by the component classes (S228 to S238). In this level, if there is a term present only in the supplier dictionary, the term is skipped. When there is the identical term, and there is a difference of definition between objects, the error occurs.

This respect will be described in more detail. The instances of all the component classes are obtained from the supplier dictionary, and assigned to the list L1 (step S220). Subsequently, the instances of all the component classes are obtained from the standard dictionary, and assigned to the list L2 (step S221). Next, the top element E of the list L1 is obtained (step S222). The dictionary conformity rule data is next read (step S223).

Subsequently, it is checked whether or not the element S satisfying "RULE1" exists in the element E in L2 (step S224).

When the element does not exist as a result of the check in the step S224, it is checked whether or not the element S satisfying "RULE2" exists in the element E (step S225). Moreover, when the element exists as a result of the check in the step S224, it is checked whether or not "RULE6" is established in the elements E and S (step S226).

When the element does not exist as a result of the check in the step S226, the error message is displayed (step S227), and the processing ends. However, when the element exists, the processing shifts to step S228.

On the other hand, when the element S satisfying "RULE2" does not exist in the element E in the list L2 as a result of the check in the step S225, the processing shifts to step S236. However, when the element exists, the processing shifts to step S226.

In the step S228, the values of the element E, Visible_property are obtained, and assigned to the list L3. Subsequently, the values of the element S, Visible_property are obtained, and assigned to the list L4 (step S229). Subsequently, the top element P of the list L3 is obtained (step S230).

Subsequently, it is checked whether or not the element Q satisfying "RULE4" exists in the element E in the list L4 (step S231).

When the element does not exist as a result of the check in the step S231, the error message is displayed (step S233), and the processing ends. However, when the element exists, the processing shifts to step S232.

It is checked in the step S232 whether or not "RULE5" is established in the elements E, S. When the rule is not established as a result, the error message is displayed (step S233), and the processing ends. When the rule is established, the processing shifts to step S234.

It is checked in the step S234 whether or not the element P of the list L3 being processed is the end of the list L3. Subsequently, when the element is not the end as a result of the check, the element of the list L3 is assigned to E (step S235), and the processing in and after the step S231 is repeated. However, when the element is the end, it is checked whether or not the element E is the end of the list L1 (step S236).

Subsequently, when the element is not the end as a result of the check in the step S236, the next element of the list L3 is assigned to E (step S238), and the processing in and after the step S231 is repeated. However, when the element is the end, "Level 2E" is recognized/determined (step S237), and the processing ends.

When "Level 2E" is determined as a result of the processing, the supplier can display the checked supplier dictionary presented by the supplier itself as the "Level 2E" conformity.

Processing Procedure of "Level 3C" Verification Program

Figure 24:
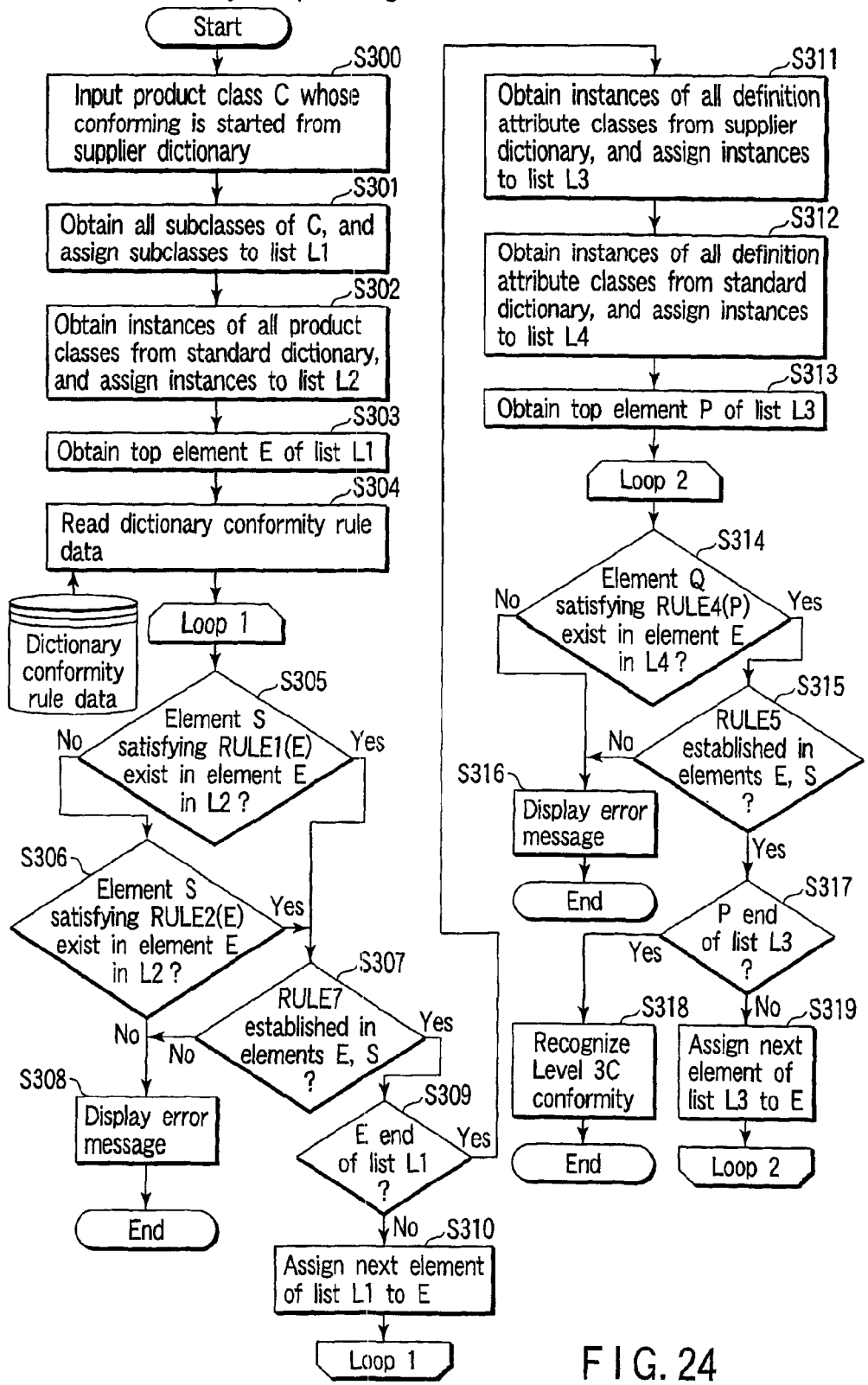
FIG. 24 is a flowchart showing a processing procedure of a program for verifying Level 3C included in the conformity level verification program 6 in the configuration of FIG. 1.

FIG. 24 is a flowchart showing the processing procedure of the program for verifying "Level 3C" included in the conformity level verification program 6 in FIG. 1. The verification is performed using "RULE1", "RULE2", "RULE7", "RULE4", "RULE5" stored in the dictionary conformity rule data shown in FIG. 32. First, the partial hierarchical structure of the component class with which the user desires the conformity is obtained, the identity is verified with respect to the component class of the user catalog dictionary (supplier dictionary) and the standard dictionary (S300 to S310), and the identity is verified with respect to both the properties (S311 to S318). If there is even one disagreement in the supplier dictionary, the error occurs.

This respect will be described in more detail. Product class C whose conforming is started is inputted from the supplier dictionary (step S300). Subsequently, all subclasses of the component class C are obtained, and assigned to the list L1 (step S301). Next, the instances of all component classes are obtained from the standard dictionary, and assigned to the list L2 (step S302).

The top element E of the list L1 is obtained (step S303). The dictionary conformity rule data is next read (step S304).

Subsequently, it is checked whether or not the element S satisfying "RULE1" exists in the element E in the list L2 (step S305).

When the element does not exist as a result of the check in the step S305, it is checked whether or not the element S satisfying "RULE2" exists in the element E in the list L2 (step S306). Moreover, when the element exists as a result of the check in the step S305, it is checked whether or not "RULE7" is established in the elements E and S (step S307).

When the element does not exist as a result of the check in the step S306, the error message is displayed (step S308), and the processing ends. However, when the element exists, the processing shifts to step S307.

It is checked in the step S307 whether or not "RULE7" is established in the elements E, S. When the rule is not established as a result, the error message is displayed (step S308), and the processing ends. When the rule is established, it is checked whether or not the element E is the end of the list L1 (step S309). Subsequently, when the element is not the end, the next element of the list L1 is assigned to E, and the processing from the step S305 is again executed.

When the element E is the end of the list L1 as a result of the check in the step S309, the processing shifts to the next step S311 to obtain the instances of all the property classes from the supplier dictionary and assign the instances to the list L3. Subsequently, the instances of all the property classes are obtained from the standard dictionary, and assigned to the list L4 (step S312). The top element P of the list L3 is next obtained (step S313). It is next checked whether or not the element Q satisfying "RULE4" exists in the element E in L4 (step S314).

When the element does not exist as a result of the check in the step S314, the error message is displayed (step S316), and the processing ends. However, when the element exists, the processing shifts to step S315.

It is checked in the step S315 whether or not "RULE5" is established in the elements E, S. When the rule is not established as a result, the error message is displayed (step S316), and the processing ends. When the rule is established, the processing shifts to step S317. It is checked in the step S317 whether or not the element P of the list L3 being processed is the end of the list L3. Subsequently, when the element is not the end as a result of the check, the element of the list L3 is assigned to E (step S319), and the processing in and after the step S314 is repeated. However, when the element is the end, "Level 3C" is recognized/determined (step S318), and the processing ends.

When "Level 3C" is determined as a result of the processing, the supplier can display the checked supplier dictionary presented by the supplier itself as the "Level 3C" conformity.

Processing Procedure of "Level 3E" Verification Program

Figure 25:
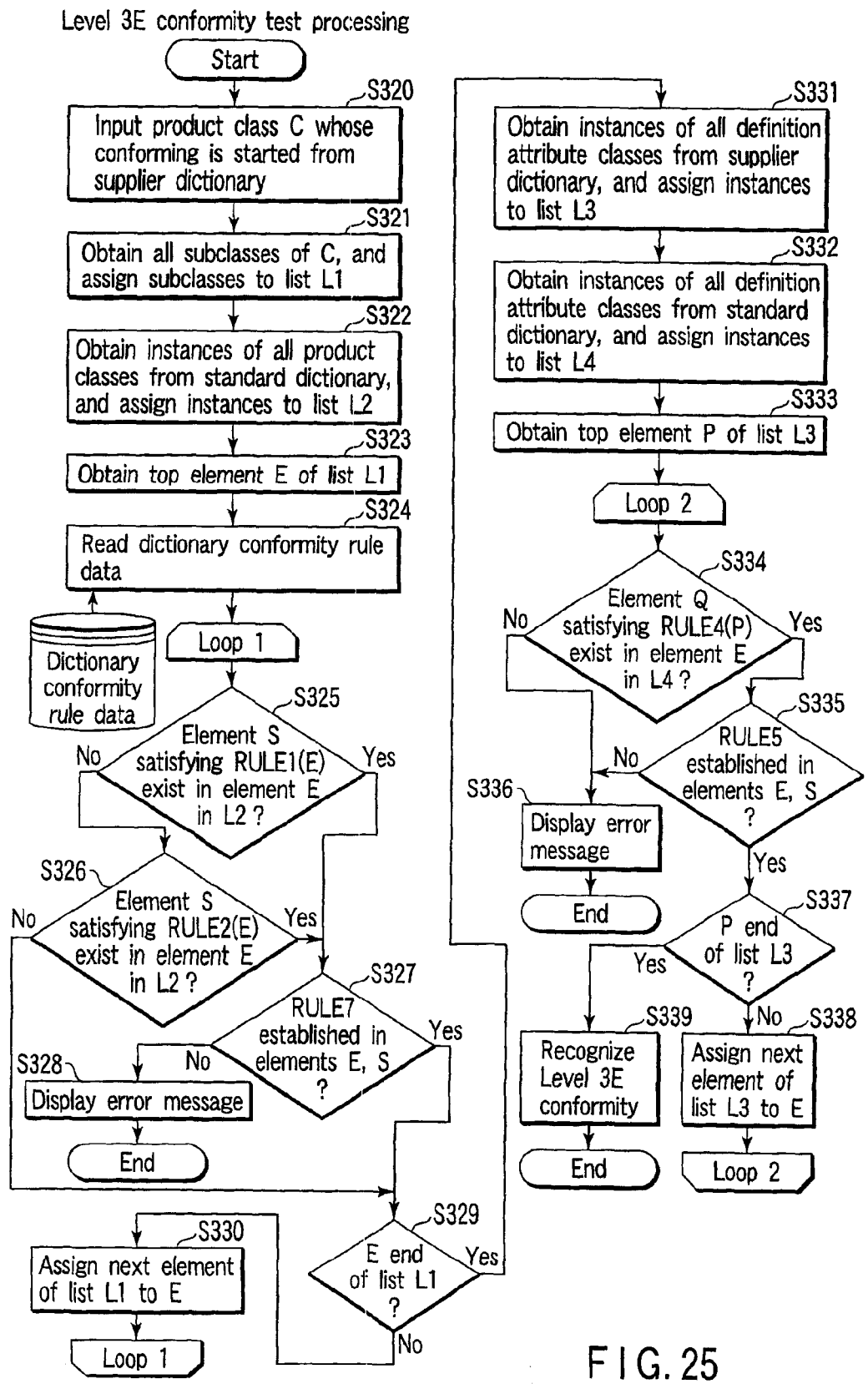
FIG. 25 is a flowchart showing a processing procedure of a program for verifying Level 3E included in the conformity level verification program 6 in the configuration of FIG. 1.

FIG. 25 is a flowchart showing the processing procedure of the program for verifying "Level 3E" included in the conformity level verification program 6 in FIG. 1. The verification is performed using "RULE1", "RULE2", "RULE7", "RULE4", "RULE5" stored in the dictionary conformity rule data shown in FIG. 32. The partial hierarchical structure of the component class with which the user desires the conformity is obtained, the identity is verified with respect to the component class of the user catalog dictionary (supplier dictionary) and the standard dictionary (S320 to S330), and the identity is verified with respect to both the properties (S331 to S339).

In this level, if there is a term disagreeing with that of the supplier dictionary, the term is skipped. When there is the identical term, and there is a difference of definition between the terms, the error occurs.

This respect will be described in more detail. The component class C whose conforming is started is inputted from the supplier dictionary (step S320). Subsequently, all subclasses of the component class C are obtained, and assigned to the list L1 (step S321). Next, the instances of all component classes are obtained from the standard dictionary, and assigned to the list L2 (step S322).

The top element E of the list L1 is obtained (step S323). The dictionary conformity rule data is next read (step S324).

Subsequently, it is checked whether or not the element S satisfying "RULE1" exists in the element E in the list L2 (step S325).

When the element does not exist as a result of the check in the step S325, it is checked whether or not the element S satisfying "RULE2" exists in the element E in the list L2 (step S326). Moreover, when the element exists as a result of the check in the step S325, it is checked whether or not "RULE7" is established in the elements E and S (step S327).

When the element does not exist as a result of the check in the step S326, the processing shifts to step S329. When the element exists, the processing shifts to step S327.

It is checked in the step S327 whether or not "RULE7" is established in the elements E, S. When the rule is not established as a result, the error message is displayed (step S328), and the processing ends. When the rule is established, it is checked whether or not the element E is the end of the list L1 (step S329). Subsequently, when the element is not the end, the next element of the list L1 is assigned to E (step S330), and the processing from the step S325 is again executed.

On the other hand, when the element does not exist as a result of the check in the step S326, the processing shifts to step S329.

When the element E is the end of the list L1 as a result of the check in the step S329, the processing shifts to the next step S331. In the step S331, the instances of all the property classes are obtained from the supplier dictionary, and assigned to the list L3. Subsequently, the instances of all the property classes are obtained from the standard dictionary, and assigned to the list L4 (step S332). The top element P of the list L3 is next obtained (step S333). It is next checked whether or not the element Q satisfying "RULE4" exists in the element E in L4 (step S334).

When the element does not exist as a result of the check in the step S334, the error message is displayed (step S336), and the processing ends. However, when the element exists, the processing shifts to step S335.

It is checked in the step S335 whether or not "RULE5" is established in the elements E, S. When the rule is not established as a result, the error message is displayed (step S336), and the processing ends. When the rule is established, the processing shifts to step S337. It is checked in the step S313 whether or not the element P of the list L3 being processed is the end of the list L3. Subsequently, when the element is not the end as a result of the check, the element of the list L3 is assigned to E (step S338), and the processing in and after the step S334 is repeated. However, when the element is the end, "Level 3E" is recognized/determined (step S339), and the processing ends.

When "Level 3E" is determined as a result of the processing, the supplier can display the checked supplier dictionary presented by the supplier itself as the "Level 3E" conformity.

Processing Procedure of "Level 4C" Verification Program

Figure 26:
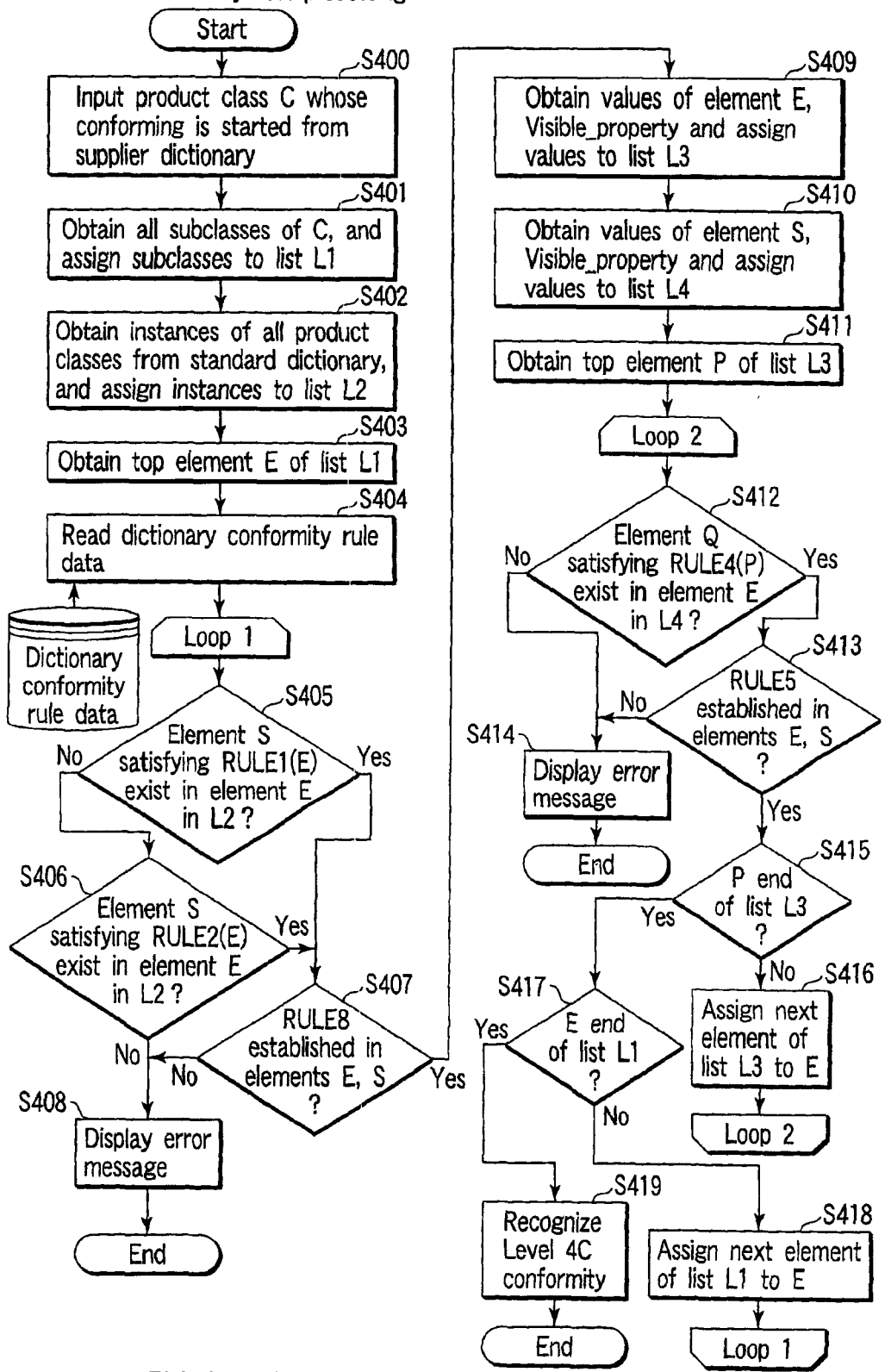
FIG. 26 is a flowchart showing a processing procedure of a program for verifying Level 4C included in the conformity level verification program 6 in the configuration of FIG. 1.

FIG. 26 is a flowchart showing the processing procedure of the program for verifying "Level 4C" included in the conformity level verification program 6 in FIG. 1. The verification is performed using "RULE1", "RULE2", "RULE8", "RULE4", "RULE5" stored in the dictionary conformity rule data shown in FIG. 32. The partial hierarchical structure of the component class with which the user desires the conformity is obtained, the identity is verified with respect to the component class of the user catalog dictionary (supplier dictionary) and the standard dictionary (S400 to S408), and the identity is verified with respect to the property possessed by the component class (S409 to S419). In this level, if there is even one disagreement in the supplier dictionary, the error occurs.

This respect will be described in more detail. The component class C whose conforming is started is inputted from the supplier dictionary (step S400). Subsequently, all subclasses of the component class C are obtained, and assigned to the list L1 (step S401). Next, the instances of all component classes are obtained from the standard dictionary, and assigned to the list L2 (step S402). Subsequently, the top element E of the list L1 is obtained (step S403). The dictionary conformity rule data is next read (step S404).

Subsequently, it is checked whether or not the element S satisfying "RULE1" exists in the element E in L2 (step S405).

When the element does not exist as a result of the check in the step S405, it is checked whether or not the element S satisfying "RULE2" exists in the element E in L2 (step S406). Moreover, when the element exists as a result of the check in the step S405, it is checked whether or not "RULE8" is established in the elements E and S (step S407).

When the element does not exist as a result of the check in the step S406, the error message is displayed (step S408), and the processing ends. When the element exists, the processing shifts to step S407.

It is checked in the step S407 whether or not "RULE8" is established in the elements E, S. When the rule is not established as a result, the error message is displayed (step S408), and the processing ends. When the rule is established, the processing shifts to step S409.

In the step S409, the values of the element E, Visible_property are obtained, and assigned to the list L3. Subsequently, the values of the element S, Visible_property are obtained, and assigned to the list L4 (step S410). Subsequently, the top element P of the list L3 is obtained (step S411).

Subsequently, it is checked whether or not the element Q satisfying "RULE4" exists in the element E in L4 (step S412).

When the element does not exist as a result of the check in the step S412, the error message is displayed (step S414), and the processing ends. However, when the element exists, the processing shifts to step S413.

It is checked in the step S413 whether or not "RULE5" is established in the elements E, S. When the rule is not established as a result, the error message is displayed (step S414), and the processing ends. When the rule is established, the processing shifts to step S415. It is checked in the step S415 whether or not the element E of the list L3 being processed is the end of the list L3. Subsequently, when the element is not the end as a result of the check, the element of the list L3 is assigned to E (step S416), and the processing in and after the step S412 is repeated. When the element is the end, it is checked whether or not the element E is the end of the list L1 (step S417).

Subsequently, when the element is not the end, the next element of the list L3 is assigned to E (step S418), and the processing in and after the step S405 is repeated. However, when the element is the end, "Level 4C" is recognized/determined (step S419), and the processing ends.

When "Level 4C" is determined as a result of the processing, the supplier can display the checked supplier dictionary presented by the supplier itself as the "Level 4C" conformity.

Processing Procedure of "Level 4E" Verification Program

Figure 27:
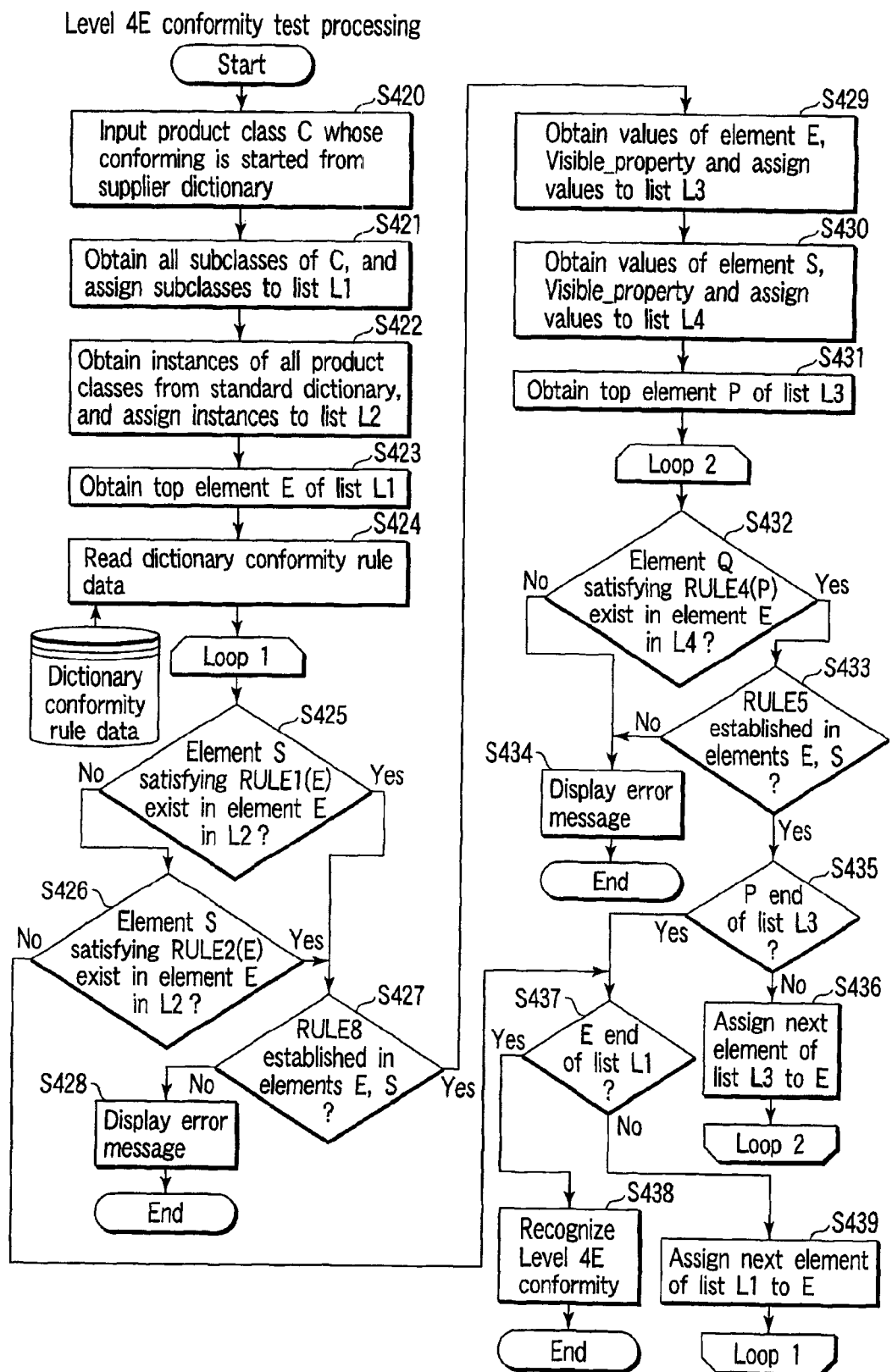
FIG. 27 is a flowchart showing a processing procedure of a program for verifying Level 4E included in the conformity level verification program 6 in the configuration of FIG. 1.

FIG. 27 is a flowchart showing the processing procedure of the program for verifying "Level 4E" included in the conformity level verification program 6 in FIG. 1. The verification is performed using "RULE1", "RULE2", "RULE8", "RULE4", "RULE5" stored in the dictionary conformity rule data shown in FIG. 32. The partial hierarchical structure of the component class with which the user desires the conformity is obtained, the identity is verified with respect to the component class of the user catalog dictionary (supplier dictionary) and the standard dictionary (S420 to S428), and the identity is verified with respect to the property possessed by the component class (S429 to S439). In this level, if there is a term disagreeing with that of the supplier dictionary, the term is skipped. When there is the identical term, and there is a difference of definition between objects, the error occurs.

This respect will be described in more detail. The component class C whose conforming is started is inputted from the supplier dictionary (step S420). Subsequently, all subclasses of the component class C are obtained, and assigned to the list L1 (step S421). Next, the instances of all component classes are obtained from the standard dictionary, and assigned to the list L2 (step S422). Subsequently, the top element E of the list L1 is obtained (step S423). The dictionary conformity rule data is next read (step S424).

Subsequently, it is checked whether or not the element S satisfying "RULE1" exists in the element E in L2 (step S425).

When the element does not exist as a result of the check in the step S425, it is checked whether or not the element S satisfying "RULE2" exists in the element E in L2 (step S426). Moreover, when the element exists as a result of the check in the step S425, it is checked whether or not "RULE8" is established in the elements E and S (step S427).

When the element does not exist as a result of the check in the step S426, the processing shifts to step S437. However, when the element exists, the processing shifts to the step S427.

It is checked in the step S427 whether or not "RULE8" is established in the elements E, S. When the rule is not established as a result, the error message is displayed (step S428), and the processing ends. When the rule is established, the processing shifts to step S429.

In the step S429, the values of the element E, Visible_property are obtained, and assigned to the list L3. Subsequently, the values of the element S, Visible_property are obtained, and assigned to the list L4 (step S430). Subsequently, the top element P of the list L3 is obtained (step S431).

Subsequently, it is checked whether or not the element Q satisfying "RULE4" exists in the element E in the list L4 (step S432).

When the element does not exist as a result of the check in the step S432, the error message is displayed (step S434), and the processing ends. However, when the element exists, the processing shifts to step S433.

It is checked in the step S433 whether or not "RULE5" is established in the elements E, S. When the rule is not established as a result, the error message is displayed (step S434), and the processing ends. When the rule is established, the processing shifts to step S435. It is checked in the step S435 whether or not the element E of the list L3 being processed is the end of the list L3. Subsequently, when the element is not the end as a result of the check, the element of the list L3 is assigned to E (step S436), and the processing in and after the step S432 is repeated. When the element is the end, it is checked whether or not the element E is the end of the list L1 (step S437).

Subsequently, when the element is not the end, the next element of the list L3 is assigned to E (step S439), and the processing in and after the step S425 is repeated. However, when the element is the end, "Level 4E" is recognized/determined (step S439), and the processing ends.

When "Level 4E" is determined as a result of the processing, the supplier can display the checked supplier dictionary presented by the supplier itself as the "Level 4E" conformity.

Processing Procedure of "Level 5C" Verification Program

Figure 28:
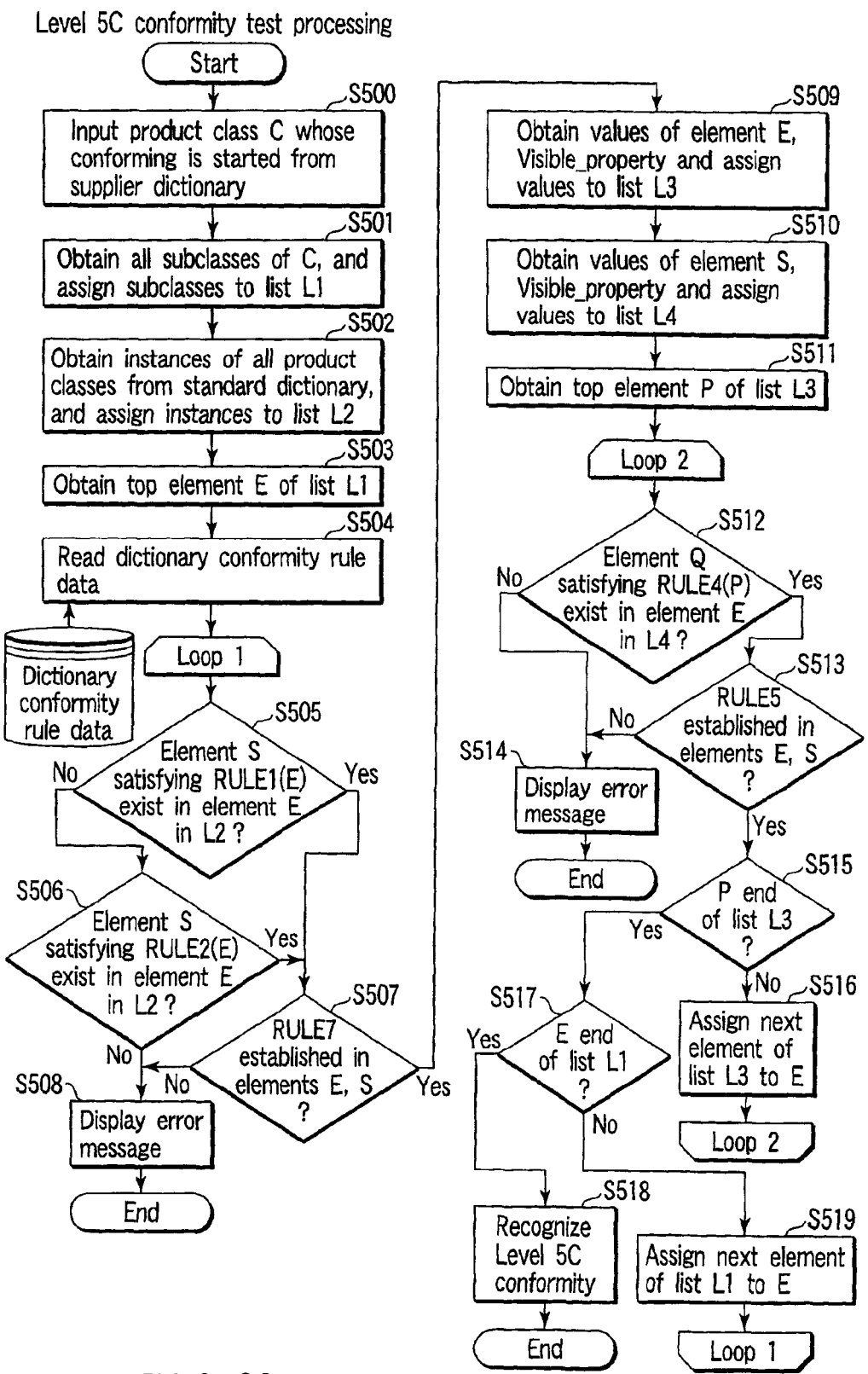
FIG. 28 is a flowchart showing a processing procedure of a program for verifying Level 5C included in the conformity level verification program 6 in the configuration of FIG. 1.

FIG. 28 is a flowchart showing the processing procedure of the program for verifying "Level 5C" included in the conformity level verification program 6 in FIG. 1. The verification is performed using "RULE1", "RULE2", "RULE7", "RULE4", "RULE5" stored in the dictionary conformity rule data shown in FIG. 32. The identity is verified with respect to the component class of the user catalog dictionary (supplier dictionary) and the standard dictionary (S500 to S508), and the identity is verified with respect to the property possessed by the component class (S509 to S519). In this level, if there is even one disagreement in the supplier dictionary, the error occurs.

This respect will be described in more detail. The component class C whose conforming is started is inputted from the supplier dictionary (step S500). Subsequently, all subclasses of the component class C are obtained, and assigned to the list L1 (step S501). Next, the instances of all component classes are obtained from the standard dictionary, and assigned to the list L2 (step S502). Subsequently, the top element E of the list L1 is obtained (step S503). The dictionary conformity rule data is next read (step S504).

Subsequently, it is checked whether or not the element S satisfying "RULE1" exists in the element E in the list L2 (step S505).

When the element does not exist as a result of the check in the step S505, it is checked whether or not the element S satisfying "RULE2" exists in the element E in L2 (step S506). Moreover, when the element exists as a result of the check in the step S505, it is checked whether or not "RULE7" is established in the elements E and S (step S507).

When the element does not exist as a result of the check in the step S506, the error message is displayed (step S508), and the processing ends. However, when the element exists, the processing shifts to the step S507.

It is checked in the step S507 whether or not "RULE7" is established in the elements E, S. When the rule is not established as a result, the error message is displayed (step S508), and the processing ends. When the rule is established, the processing shifts to step S509.

In the step S509, the values of the element E, Visible_property are obtained, and assigned to the list L3. Subsequently, the values of the element S, Visible_property are obtained, and assigned to the list L4 (step S510). Subsequently, the top element P of the list L3 is obtained (step S511).

Subsequently, it is checked whether or not the element Q satisfying "RULE4" exists in the element E in L4 (step S512).

When the element does not exist as a result of the check in the step S512, the error message is displayed (step S514), and the processing ends. However, when the element exists, the processing shifts to step S513.

It is checked in the step S513 whether or not "RULE5" is established in the elements E, S. When the rule is not established as a result, the error message is displayed (step S514), and the processing ends. When the rule is established, the processing shifts to step S515. It is checked in the step S515 whether or not the element E of the list L3 being processed is the end of the list L3. Subsequently, when the element is not the end as a result of the check, the element of the list L3 is assigned to E (step S516), and the processing in and after the step S512 is repeated. When the element is the end, it is checked whether or not the element E is the end of the list L1 (step S517).

Subsequently, when the element is not the end, the next element of the list L1 is assigned to E (step S519), and the processing in and after the step S505 is repeated. However, when the element is the end, "Level 5C" is recognized/determined (step S518), and the processing ends.

When "Level 5C" is determined as a result of the processing, the supplier can display the checked supplier dictionary presented by the supplier itself as the "Level 5C" conformity.

Processing Procedure of "Level 5E" Verification Program

Figure 29:
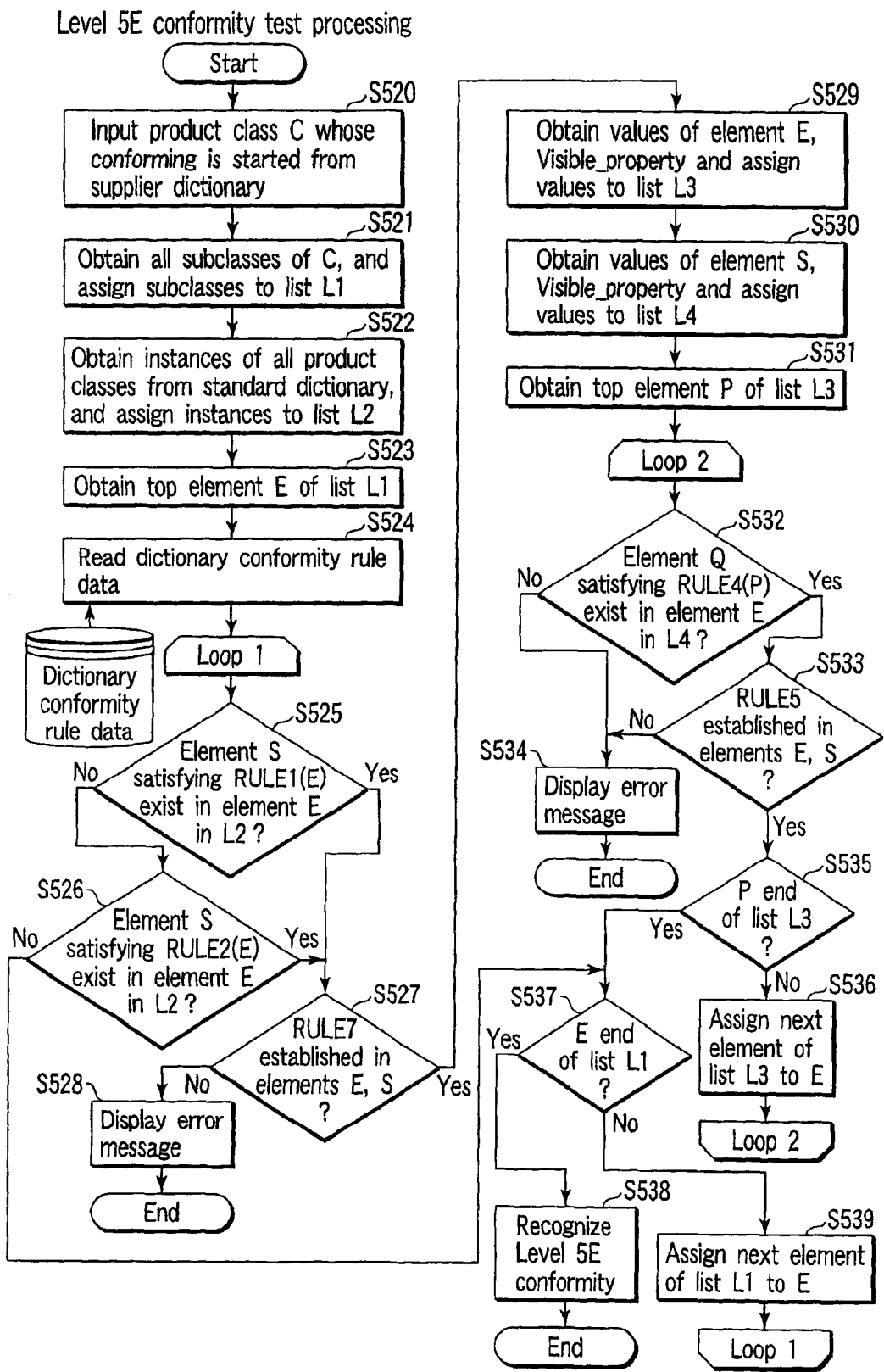
FIG. 29 is a flowchart showing a processing procedure of a program for verifying Level 5E included in the conformity level verification program 6 in the configuration of FIG. 1.

FIG. 29 is a flowchart showing the processing procedure of the program for verifying "Level 5E" included in the conformity level verification program 6 in FIG. 1. The verification is performed using "RULE1", "RULE2", "RULE7", "RULE4", "RULE5" stored in the dictionary conformity rule data shown in FIG. 32. The identity is verified with respect to the component class of the user catalog dictionary (supplier dictionary) and the standard dictionary (S520 to S528), and the identity is verified with respect to the property possessed by the component class (S529 to S539). In this level, if there is a term disagreeing with that of the supplier dictionary, the term is slipped. When there is the identical term and there is a difference of the term definition, the error occurs.

This respect will be described in more detail. The component class C whose conforming is started is inputted from the supplier dictionary (step S520). Subsequently, all subclasses of the component class C are obtained, and assigned to the list L1 (step S521). Next, the instances of all component classes are obtained from the standard dictionary, and assigned to the list L2 (step S522). Subsequently, the top element E of the list L1 is obtained (step S523). The dictionary conformity rule data is next read (step S524).

Subsequently, it is checked whether or not the element S satisfying "RULE1" exists in the element E in the list L2 (step S525).

When the element does not exist as a result of the check in the step S525, it is checked whether or not the element S satisfying "RULE2" exists in the element E in L2 (step S526). Moreover, when the element exists as a result of the check in the step S525, it is checked whether or not "RULE7" is established in the elements E and S (step S527).

When the element does not exist as a result of the check in the step S526, the processing shifts to step S537. However, when the element exists, the processing shifts to the step S527.

It is checked in the step S527 whether or not "RULE7" is established in the elements E, S. When the rule is not established as a result, the error message is displayed (step S528), and the processing ends. When the rule is established, the processing shifts to step S529.

In the step S529, the values of the element E, Visible_property are obtained, and assigned to the list L3. Subsequently, the values of the element S, Visible_property are obtained, and assigned to the list L4 (step S510). Subsequently, the top element P of the list L3 is obtained (step S531).

Subsequently, it is checked whether or not the element Q satisfying "RULE4" exists in the element E in L4 (step S532).

When the element does not exist as a result of the check in the step S532, the error message is displayed (step S534), and the processing ends. However, when the element exists, the processing shifts to step S533.

It is checked in the step S533 whether or not "RULE5" is established in the elements E, S. When the rule is not established as a result, the error message is displayed (step S534), and the processing ends. When the rule is established, the processing shifts to step S535. It is checked in the step S535 whether or not the element P of the list L3 being processed is the end of the list L3. Subsequently, when the element is not the end as a result of the check, the element of the list L3 is assigned to E (step S536), and the processing in and after the step S532 is repeated. When the element is the end, it is checked whether or not the element E is the end of the list L1 (step S537).

Subsequently, when the element is not the end, the next element of the list L1 is assigned to E (step S539), and the processing in and after the step S525 is repeated. However, when the element is the end, "Level 5E" is recognized/determined (step S538), and the processing ends.

When "Level 5E" is determined as a result of the processing, the supplier can display the checked supplier dictionary presented by the supplier itself as the "Level 5E" conformity.

Processing Procedure of "Level 6C" Verification Program

Figure 30:
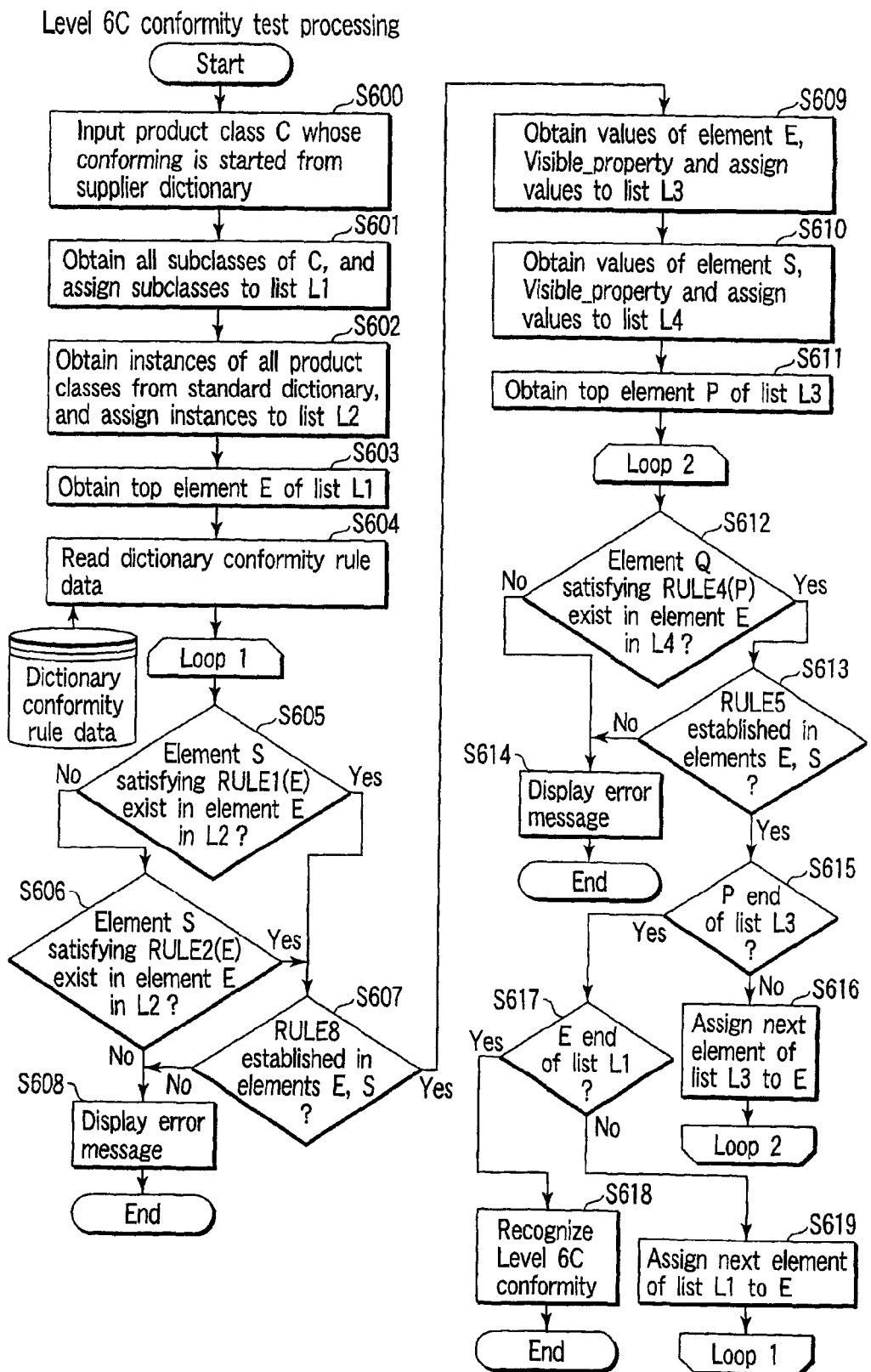
FIG. 30 is a flowchart showing a processing procedure of a program for verifying Level 6C included in the conformity level verification program 6 in the configuration of FIG. 1.

FIG. 30 is a flowchart showing the processing procedure of the program for verifying "Level 6C" included in the conformity level verification program 6 in FIG. 1. The verification is performed using "RULE1", "RULE2", "RULE8", "RULE4", "RULE5" stored in the dictionary conformity rule data shown in FIG. 32. The identity is verified with respect to the component class of the user catalog dictionary (supplier dictionary) and the standard dictionary (S600 to S608), and the identity is verified with respect to the property possessed by the component class (S609 to S619). In this level, if there is even one disagreement in the supplier dictionary, the error occurs.

This respect will be described in more detail. A most significant (root) component class C is inputted from the supplier dictionary (step S600). Subsequently, all subclasses of the component class C are obtained, and assigned to the list L1 (step S601). Next, the instances of all component classes are obtained from the standard dictionary, and assigned to the list L2 (step S602). Subsequently, the top element E of the list L1 is obtained (step S603). The dictionary conformity rule data is next read (step S604).

Subsequently, it is checked whether or not the element S satisfying "RULE1" exists in the element E in the list L2 (step S605).

When the element does not exist as a result of the check in the step S605, it is checked whether or not the element S satisfying "RULE2" exists in the element E in L2 (step S606). Moreover, when the element exists as a result of the check in the step S605, it is checked whether or not "RULE8" is established in the elements E and S (step S607).

When the element does not exist as a result of the check in the step S606, the error message is displayed (step S608), and the processing ends. However, when the element exists, the processing shifts to the step S607.

It is checked in the step S607 whether or not "RULE8" is established in the elements E, S. When the rule is not established as a result, the error message is displayed (step S608), and the processing ends. When the rule is established, the processing shifts to step S609.

In the step S609, the values of the element E, Visible_property are obtained, and assigned to the list L3. Subsequently, the values of the element S, Visible_property are obtained, and assigned to the list L4 (step S610). Subsequently, the top element P of the list L3 is obtained (step S611).

Subsequently, it is checked whether or not the element Q satisfying "RULE4" exists in the element E in L4 (step S612).

When the element does not exist as a result of the check in the step S612, the error message is displayed (step S614), and the processing ends. However, when the element exists, the processing shifts to step S613.

It is checked in the step S613 whether or not "RULE5" is established in the elements E, S. When the rule is not established as a result, the error message is displayed (step S614), and the processing ends. When the rule is established, the processing shifts to step S615. It is checked in the step S615 whether or not the element P of the list L3 being processed is the end of the list L3. Subsequently, when the element is not the end as a result of the check, the element of the list L3 is assigned to E (step S616), and the processing in and after the step S612 is repeated. When the element is the end, it is checked whether or not the element E is the end of the list L1 (step S617).

Subsequently, when the element is not the end, the next element of the list L1 is assigned to E (step S619), and the processing in and after the step S615 is repeated. However, when the element is the end, "Level 6C" is recognized/determined (step S618), and the processing ends.

When "Level 6C" is determined as a result of the processing, the supplier can display the checked supplier dictionary presented by the supplier itself as the "Level 6C" conformity.

Processing Procedure of "Level 6E" Verification Program

Figure 31:
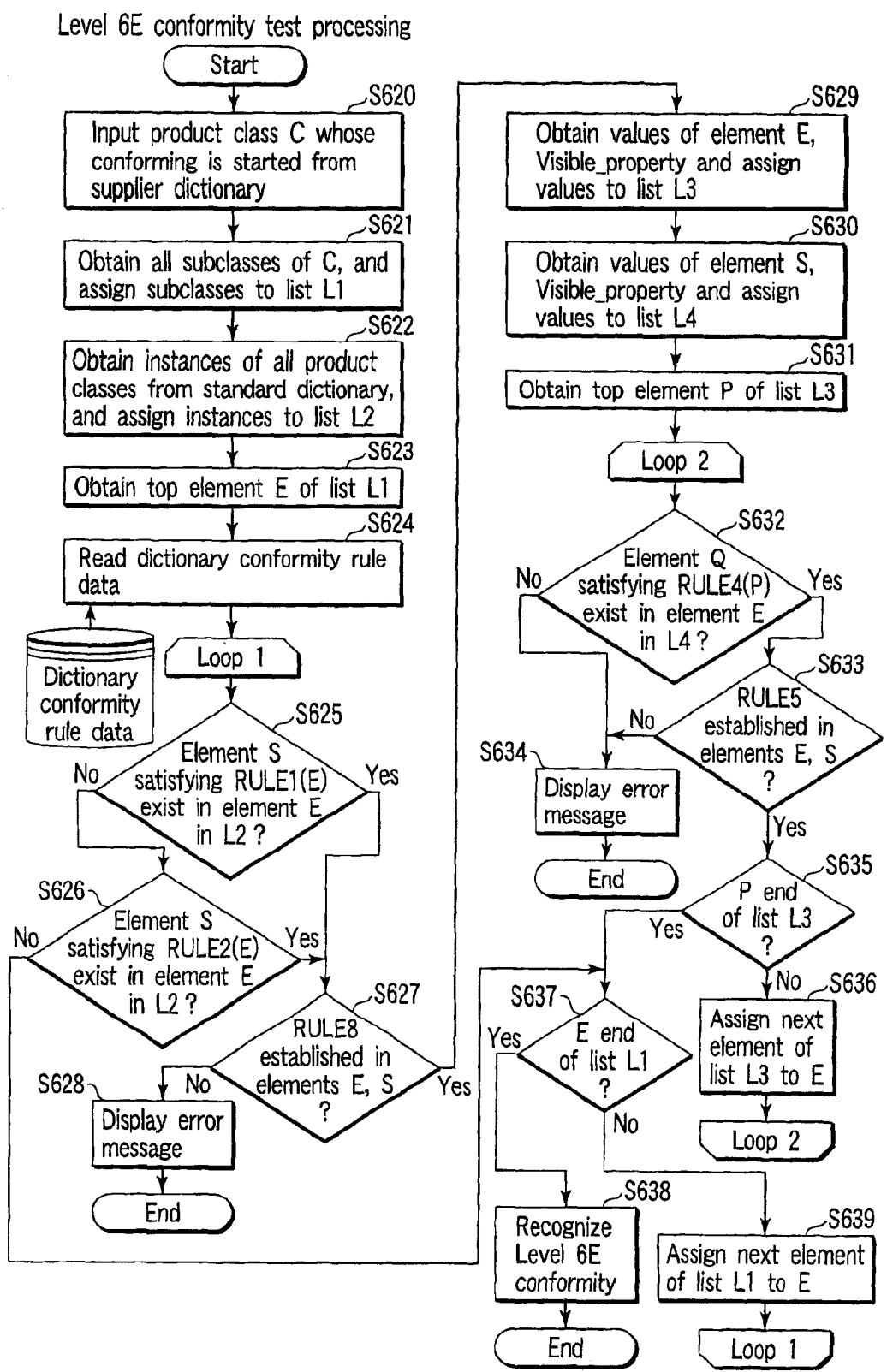
FIG. 31 is a flowchart showing a processing procedure of a program for verifying Level 6E included in the conformity level verification program 6 in the configuration of FIG. 1.

FIG. 31 is a flowchart showing the processing procedure of the program for verifying "Level 6E" included in the conformity level verification program 6 in FIG. 1. The verification is performed using "RULE1", "RULE2", "RULE8", "RULE4", "RULE5" stored in the dictionary conformity rule data shown in FIG. 32. The identity is verified with respect to the component class of the user catalog dictionary (supplier dictionary) and the standard dictionary (S620 to S628), and the identity is verified with respect to the property possessed by the component class (S629 to S639). In this level, if there is a term disagreeing with the supplier dictionary, the term is skipped. When there is the identical term and there is a difference of object definition, the error occurs.

This respect will be described in more detail. The most significant (root) component class C is inputted from the supplier dictionary (step S620). Subsequently, all subclasses of the component class C are obtained, and assigned to the list L1 (step S621). Next, the instances of all component classes are obtained from the standard dictionary, and assigned to the list L2 (step S622). Subsequently, the top element E of the list L1 is obtained (step S623). The dictionary conformity rule data is next read (step S624).

Subsequently, it is checked whether or not the element S satisfying "RULE1" exists in the element E in L2 (step S625).

When the element does not exist as a result of the check in the step S625, it is checked whether or not the element S satisfying "RULE2" exists in the element E in L2 (step S626). Moreover, when the element exists as a result of the check in the step S625, it is checked whether or not "RULE8" is established in the elements E and S (step S627).

When the element does not exist as a result of the check in the step S626, the processing shifts to step S637. However, when the element exists, the processing shifts to the step S627.

It is checked in the step S627 whether or not "RULE8" is established in the elements E, S. When the rule is established, the processing shifts to step S629. However, when the rule is not established, the error message is displayed (step S628), and the processing ends. When the rule is established, the processing shifts to step S629.

In the step S629, the values of the element E, Visible_property are obtained, and assigned to the list L3. Subsequently, the values of the element S, Visible_property are obtained, and assigned to the list L4 (step S630). Subsequently, the top element P of the list L3 is obtained (step S631).

Subsequently, it is checked whether or not the element Q satisfying "RULE4" exists in the element E in L4 (step S632).

When the element does not exist as a result of the check in the step S632, the error message is displayed (step S634), and the processing ends. However, when the element exists, the processing shifts to step S633.

It is checked in the step S633 whether or not "RULE5" is established in the elements E, S. When the rule is not established as a result, the error message is displayed (step S634), and the processing ends. When the rule is established, the processing shifts to step S635. It is checked in the step S635 whether or not the element P of the list L3 being processed is the end of the list L3. Subsequently, when the element is not the end as a result of the check, the element of the list L3 is assigned to E (step S636), and the processing in and after the step S632 is repeated. When the element is the end, it is checked whether or not the element E is the end of the list L1 (step S637).

Subsequently, when the element is not the end, the next element of the list L1 is assigned to E (step S639), and the processing in and after the step S625 is repeated. However, when the element is the end, "Level 6E" is recognized/determined (step S638), and the processing ends.

When "Level 6E" is determined as a result of the processing, the supplier can display the checked supplier dictionary presented by the supplier itself as the "Level 6E" conformity.

<Verification Rule Data>

FIG. 32 is an explanatory view of verification rule data for use in the processing procedures in the verification programs of FIGS. 20 to 31. Information used in these rules are based on a data model defined by "ISO13584-42".

[1] "RULE1":

This is a rule for judging that the term of a component class "A" in the standard dictionary is the same as that of a component class "B" in the supplier dictionary (dictionary extended by the user).

[2] "RULE2":

This is a rule for judging that the term of the component class "A" in the standard dictionary is the same as that of the component class "B" in the supplier dictionary (is _case_ of).

[3] "RULE3":

This is a rule for judging that the definition of the component class "A" in the standard dictionary is the same as that of the component class "B" in the supplier dictionary.

[4] "RULE4":

This is a rule for judging that the term of a property "A" in the standard dictionary is the same as that of a property "B" in the supplier dictionary.

[5] "RULE5":

This is a rule for judging that the definition of the property "A" in the standard dictionary is the same as that of the property "B" in the supplier dictionary.

[6] "RULE6":

This is a rule for judging that the definition as the object of the component class "A" in the standard dictionary is the same as that of the component class "B" in the supplier dictionary.

[7] "RULE7":

This is a rule for judging that the hierarchical structure of the component class "A" in the standard dictionary is the same as that of the component class "B" in the supplier dictionary.

[8] "RULE8":

This is a rule for judging that the component class "A" in the standard dictionary and the component class "B" in the supplier dictionary have the same hierarchical structure, and are the same as the object.

A certain user uses the electronic catalog system of the international standards to prepare the electronic catalog data of the user's company, and opens the product data so that the third party can utilize the product data. In this case, the user (supplier who desires to open the product data) files the application for the license with respect to the window system of the management operation organization. Then, the window system checks the conformity level of the catalog product data prepared by the user with respect to the standard dictionary from the application content, grants the license in accordance with the conformity level, also grants the verification program corresponding to the conformity level, and charges the fee for the granted license. The user verifies the user dictionary used in the catalog product data developed by the user with the granted verification program, and obtains the approval of the conformity level.

The conformity level of the catalog product data opened from the user having received the license is secured in accordance with the licensed content and the quality can be maintained. The fee is charged in accordance with the license content. For example, when the conformity level is higher, the fee is set to be smaller. The operation for charging the fee in such fee system is realized. The supply of the catalog product data is naturally induced so that the catalog product data are in conformity with the standard dictionary. Therefore, the environment can be constructed in which the extended versions are inhibited from being rampantly distributed and the catalog product data in conformity with the standard dictionary are broadly distributed.

Moreover, according to the embodiment of the present embodiment, instead of utilizing the standard dictionary for use in the electronic catalog system of the international standards as it is, the user (catalog product data supplier) itself extends the dictionary, and prepares the catalog product data supplier's own dictionary (user dictionary). When the user uses the dictionary to prepare the catalog product data, the user verifies the conformity level of the dictionary extended and prepared by the supplier by the verification program granted in accordance with the conformity level from the operation window during granting of the license. The quality of the supplier dictionary can be clarified, and mutual operability between the dictionaries can easily be realized. Furthermore, when a pay license is set in accordance with the extension type, the conformity level with the standard dictionary can be enhanced. Additionally, a foundation can be secured to make a fund for returning a counter value (copyright fee) for the prepared original standard dictionary to a copyright possessor.

Moreover, when the conformity level of the dictionary is set based on the data structure of "ISO13584-24" further extended as the information model, a finer level can of course be set. Furthermore, in the present embodiment, "IEC61360" is used as the standard dictionary, but it is needless to say that the present invention can also be applied to another dictionary system having the similar structure.

Moreover, when the conformity level verification program free of charge is distributed to the public, the user can of course check the verification of the quality with respect to the dictionary extended by the supplier. Furthermore, a supplier code manager uses the information of the supplier information management DB 7 to periodically check the electronic catalog dictionary of each supplier. If there is any violation, it is also possible to issue a warning and urge the quality to be secured.

The present embodiment can be embodied as a program able to be executed by a computer in recording mediums such as a magnetic disk (flexible disk, hard disk, and the like), optical disk (CD-ROM, CD-R, CD-RW, DVD, MO, and the like), and semiconductor memory, and can also be transmitted/distributed via a network.

As described above, according to the embodiment of the present invention, there can be provided the level for measuring the degree of conformity of the dictionary extended by the supplier with respect to the existing standard dictionary. When the quality of the extended dictionary is clarified, the reliability of the whole electronic catalog can be enhanced. Furthermore, it is possible to enhance mutual compatibility between the supplier dictionary and the standard dictionary, or between the supplier dictionaries. Additionally, when there is provided the method of charging the fee based on the extension degree, the conformity level with the standard dictionary can entirely be enhanced. Moreover, funds can be secured to compensate for the counter value of labor/expense for preparing the original dictionary.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for accepting and processing an application for conformity of a supplier dictionary to a standard dictionary using a computer system, said standard dictionary, which is used for an electronic catalog of a component, having a classification hierarchy consisted of a component class related to a tree structure and a property of the component class, said method comprising;

receiving application data for said application transmitted from said supplier in respect to said supplier dictionary, the application data including information as to whether or not the supplier dictionary is intended for open to public, a conformity level, and a license level;

determining whether or not said supplier dictionary is intended for open to public with reference to said application data;

determining charge level according to the conformity level and the license level included in said application data if the supplier dictionary is intended for open to public;

transmitting data indicating the determined charge level to said supplier;

transmitting a verification program to said supplier in order to verify, at the side of said supplier, the conformity at the conformity level indicated in said application data;

transmitting said standard dictionary to said supplier; and charging said supplier in accordance with said determined charge level.

2. The method of claim 1, wherein if said supplier dictionary is not intended for open to public, the verification program for verifying the conformity at the conformity level indicated in the application data is transmitted to the supplier without charging the supplier.

3. The method of claim 1, further comprising:
issuing a supplier code for identifying said supplier, the supplier code being related to said application data.

4. The method of claim 1, further comprising:
storing data regarding the supplier while associating the data with the issued supplier code.

5. The method of claim 1, wherein said conformity level includes:
a first conformity level in which the supplier dictionary is in conformity with the standard dictionary regarding terms, but out of conformity regarding the classification hierarchy and the property;

a second conformity level in which the supplier dictionary is in conformity with the standard dictionary regarding an object of the component, but out of conformity regarding the classification hierarchy;

a third conformity level in which the supplier dictionary is in conformity with the standard dictionary regarding a part of the classification hierarchy, but out of conformity regarding the property;

a fourth conformity level in which the supplier dictionary is in conformity with the standard dictionary regarding a part of the classification hierarchy and the property thereof;

a fifth conformity level in which the supplier dictionary is in conformity with the standard dictionary regarding the entire classification hierarchy, but out of conformity regarding the property; and a sixth conformity level in which the supplier dictionary is in conformity with the standard dictionary regarding the entire classification hierarchy and the property thereof.

6. The method of claim 1, wherein said license level includes:
a first license level in which the standard dictionary is used as it is;

a second license level in which a new candidate of value can be added to the property;

a third license level in which a new property can be added to the component class;

a fourth license level in which a new component class can be added to an lowermost layer of the classification hierarchy; and a fifth license level in which a new component class can be added to any layer of the classification hierarchy.

7. The method of claim 1, wherein said verification program compares the definition of the supplier dictionary with the definition of the standard dictionary based on the given conformity level, and determines whether or not the conformity level is kept according to the obtained result of comparison.

8. The method of claim 1, wherein said conformity level includes:
a first conformity level in which all of class terms in the supplier dictionary are derived from the standard dictionary;

a second conformity level in which some of class terms in the supplier dictionary are derived from standard dictionary, but others in the supplier dictionary are defined as locally;

a third conformity level in which all of class definitions in the supplier dictionary are derived from the standard dictionary;

a fourth conformity level in which some of class definitions in the supplier dictionary are derived from the standard dictionary, but others in the supplier dictionary are defined as locally;

a fifth conformity level in which all of class terms in the supplier dictionary are derived from the standard dictionary, and the classification hierarchy of the supplier dictionary is a part of classification hierarchy of the standard dictionary a sixth conformity level in which some of class terms are in the supplier dictionary are derived from standard dictionary, but others in the supplier dictionary are defined as locally, and a part of the classification hierarchy of the supplier dictionary is a part of classification hierarchy of the standard dictionary;

a seventh conformity level in which all of class definitions in the supplier dictionary are derived from the standard dictionary, and the classification hierarchy of the supplier dictionary is a part of classification hierarchy of the standard dictionary;

an eighth conformity level in which some of class definitions in the supplier dictionary are derived from the standard dictionary, but others in the supplier dictionary are defined as locally, and a part of the classification hierarchy of the supplier dictionary is a part of classification hierarchy of the standard dictionary;

a ninth conformity level in which all of class terms in the supplier dictionary are derived from the standard dictionary, and the classification hierarchy of the supplier dictionary is equal to the classification hierarchy of the standard dictionary;

a tenth conformity level in which all of class terms of the standard dictionary are included in the supplier dictionary, and local class terms are exist, and the classification hierarchy of the standard dictionary is a part of classification hierarchy of the supplier dictionary;

an eleventh conformity level in which the supplier dictionary is equal to the standard dictionary; and a twelfth conformity level in which the standard dictionary are included in the supplier dictionary, and local class definitions are exist.

9. A computer system configured to accept and processes an application for conformity of a supplier dictionary to a standard dictionary using a computer system, said standard dictionary, which is used for an electronic catalog of a component, having a classification hierarchy consisted of a component class related to a tree structure and a property of the component class, said system comprising:
a receiver connected to a network, configured to receive application data for said application transmitted via the network from said supplier in respect to said supplier dictionary, the application data including information as to whether or not the supplier dictionary is intended for open to public, a conformity level, and a license level;

a first determination device configured to determine whether or not said supplier dictionary is intended for open to public with respect to said application data;

a second determination device configured to determine charge level according to the conformity level and the license level included in said application data if the supplier dictionary is intended for open to public;

a first transmitter configured to transmit data indicating the determined charge level to said supplier;

a second transmitter configured to transmit a verification program to said supplier in order to verify, at the side of said supplier, the conformity at the conformity level indicated in said application data;

a third transmitter configured to transmit said standard dictionary to said supplier;

a charge processing device configured to charge said supplier in accordance with said determined charge level.

10. The system of claim 9, further comprising:

a code issuing device configured to issue a supplier code for identifying said supplier, the supplier code being related to said application data.

11. The system of claim 10, further comprising:

a supplier information storing device configured to store data regarding the supplier while associating the data with the issued supplier code.

12. The system of claim 9, wherein said conformity level includes:

a first conformity level in which the supplier dictionary is in conformity with the standard dictionary regarding terms, but out of conformity regarding the classification hierarchy and the property;

a second conformity level in which the supplier dictionary is in conformity with the standard dictionary regarding an object of the component, but out of conformity regarding the classification hierarchy;

a third conformity level in which the supplier dictionary is in conformity with the standard dictionary regarding a part of the classification hierarchy, but out of conformity regarding the property;

a fourth conformity level in which the supplier dictionary is in conformity with the standard dictionary regarding a part of the classification hierarchy and the property thereof;

a fifth conformity level in which the supplier dictionary is in conformity with the standard dictionary regarding the entire classification hierarchy, but out of conformity regarding the property; and a sixth conformity level in which the supplier dictionary is in conformity with the standard dictionary regarding the entire classification hierarchy and the property thereof.

13. The system of claim 9, wherein said license level includes:

a first license level in which the standard dictionary is used as it is;

a second license level in which a new candidate of value can be added to the property;

a third license level in which a new property can be added to the component class;

a fourth license level in which a new component class can be added to an lowermost layer of the classification hierarchy; and a fifth license level in which a new component class can be added to any layer of the classification hierarchy.

14. The system of claim 9, wherein said verification program compares the definition of the supplier dictionary with the definition of the standard dictionary based on the given conformity level, and determines whether or not the conformity level is kept according to the obtained result of comparison.

15. The system of claim 9, wherein if said supplier dictionary is not intended for open to public, the verification program for verifying the conformity at the conformity level indicated in the application data is transmitted to the supplier without charging the supplier.

16. The system of claim 9, wherein said conformity level includes:

a first conformity level in which all of class terms in the supplier dictionary are derived from the standard dictionary;

a second conformity level in which some of class terms in the supplier dictionary are derived from standard dictionary, but others in the supplier dictionary are defined as locally;

a third conformity level in which all of class definitions in the supplier dictionary are derived from the standard dictionary;

a fourth conformity level in which some of class definitions in the supplier dictionary are derived from the standard dictionary, but others in the supplier dictionary are defined as locally;

a fifth conformity level in which all of class terms in the supplier dictionary are derived from the standard dictionary, and the classification hierarchy of the supplier dictionary is a part of classification hierarchy of the standard dictionary a sixth conformity level in which some of class terms are in the supplier dictionary are derived from standard dictionary, but others in the supplier dictionary are defined as locally, and a part of the classification hierarchy of the supplier dictionary is a part of classification hierarchy of the standard dictionary;

a seventh conformity level in which all of class definitions in the supplier dictionary are derived from the standard dictionary, and the classification hierarchy of the supplier dictionary is a part of classification hierarchy of the standard dictionary;

an eighth conformity level in which some of class definitions in the supplier dictionary are derived from the standard dictionary, but others in the supplier dictionary are defined as locally, and a part of the classification hierarchy of the supplier dictionary is a part of classification hierarchy of the standard dictionary;

a ninth conformity level in which all of class terms in the supplier dictionary are derived from the standard dictionary, and the classification hierarchy of the supplier dictionary is equal to the classification hierarchy of the standard dictionary;

a tenth conformity level in which all of class terms of the standard dictionary are included in the supplier dictionary, and local class terms are exist, and the classification hierarchy of the standard dictionary is a part of classification hierarchy of the supplier dictionary;

an eleventh conformity level in which the supplier dictionary is equal to the standard dictionary; and a twelfth conformity level in which the standard dictionary are included in the supplier dictionary, and local class definitions are exist.

17. A recording medium stored thereon a computer readable program for enabling a computer to accept and processes an application for conformity of a supplier dictionary to a standard dictionary using a computer system, said standard dictionary, which is used for an electronic catalog of a component, having a classification hierarchy consisted of a component class related to a tree structure and a property of the component class, said program comprising:

a first program code enabling the computer to receive application data for said application transmitted via a network from said supplier in respect to said supplier dictionary, the application data including information as to whether or not the supplier dictionary is intended for open to public, a conformity level, and a license level;

a second program code enabling the computer to determine whether or not said supplier dictionary is intended for open to public with respect to said application data;

a third program code enabling the computer to determine charge level according to the conformity level and the license level included in said application data if the supplier dictionary is intended for open to public;

a fourth program code enabling the computer to transmit said standard dictionary to said supplier;

a fifth program code enabling the computer to transmit data indicating the determined charge level to said supplier;

a sixth program code enabling the computer to transmit a verification program to said supplier in order to verify, at the side of said supplier, the conformity at the conformity level indicated in said application data; and a seventh program code enabling the computer to charge said supplier in accordance with said determined charge level.

* * * * *